(12) United States Patent
Parker

(10) Patent No.: US 12,515,050 B2
(45) Date of Patent: Jan. 6, 2026

(54) MEASUREMENT OF NEURAL RESPONSES TO NEUROSTIMULATION

(71) Applicant: Saluda Medical Pty Ltd, Level (AU)

(72) Inventor: Daniel John Parker, Artarmon (AU)

(73) Assignee: Saluda Medical Pty Ltd, Macquarie Park (AU)

( * ) Notice: Subject to any disclaimer, the term of this patent is extended or adjusted under 35 U.S.C. 154(b) by 357 days.

(21) Appl. No.: 18/164,495

(22) Filed: Feb. 3, 2023

(65) Prior Publication Data

US 2023/0310864 A1 Oct. 5, 2023

(30) Foreign Application Priority Data

Feb. 4, 2022 (AU) .............................. 2022900218

(51) Int. Cl.
*A61N 1/36* (2006.01)
*A61B 5/388* (2021.01)

(52) U.S. Cl.
CPC .......... *A61N 1/36139* (2013.01); *A61B 5/388* (2021.01)

(58) Field of Classification Search
None
See application file for complete search history.

(56) References Cited

U.S. PATENT DOCUMENTS 6,931,281 B2  8/2005  Bradley et al.
2014/0236042 A1  8/2014  Parker et al.

(Continued)

FOREIGN PATENT DOCUMENTS

WO  WO2012155183  11/2012
WO  WO2012155185 A1  11/2012

(Continued)

*Primary Examiner* — Ankit D Tejani
(74) *Attorney, Agent, or Firm* — Barnes & Thornburg LLP

(57) ABSTRACT

Disclosed is a neurostimulation system comprising an implantable device for controllably delivering a neural stimulus, and a processor. Signals evoked by a stimulus are sensed at each pair of sense electrodes, each sensed signal including a differential evoked compound action potential (ECAP) evoked by the delivered neural stimulus. The differential ECAP is decomposed in each sensed signal into a first single-ended ECAP corresponding to one sense electrode of the pair of sense electrodes and a second single-ended ECAP corresponding to the other sense electrode of the pair of sense electrodes. ECAP propagation model parameters are determined from the first single-ended ECAP model and the second single-ended ECAP model and from distances of the respective sense electrodes from the stimulus electrode configuration. An indication may be given to a user if one of the one or more ECAP propagation model parameters departs from a predetermined range. Or, originating ECAP model parameters may be determined from the first single-ended ECAP model and from the distance of the corresponding sense electrode from the stimulus electrode configuration. Parameters of a model of a differential ECAP at a second pair of sense electrodes may be computed; and an optimal combination of parameters for a parametric ECAP detector at the second pair of sense electrodes may be computed from the parameters of the model of the differential ECAP.

30 Claims, 11 Drawing Sheets

(56) References Cited

U.S. PATENT DOCUMENTS

| | | | | |
|---|---|---|---|---|
| 2019/0275331 A1* | 9/2019 | Zhu | ............... | A61N 1/36192 |
| 2021/0379384 A1* | 12/2021 | Esteller | ............ | A61N 1/37241 |
| 2023/0241376 A1 | 8/2023 | Single et al. | | |

FOREIGN PATENT DOCUMENTS

| | | |
|---|---|---|
| WO | WO2012155188 | 11/2012 |
| WO | WO2015074121 | 5/2015 |
| WO | WO2015074121 A1 | 5/2015 |
| WO | WO2020101853 A1 | 5/2020 |
| WO | WO2020124135 | 6/2020 |
| WO | WO2021007615 | 1/2021 |
| WO | WO2021158310 A1 | 8/2021 |
| WO | WO2022182611 A1 | 9/2022 |
| WO | WO2022183172 A1 | 9/2022 |
| WO | WO2022245970 A1 | 11/2022 |
| WO | WO2023064081 A1 | 4/2023 |
| WO | WO2023150020 A1 | 8/2023 |
| WO | WO2024065013 A1 | 4/2024 |

* cited by examiner

MEASUREMENT OF NEURAL RESPONSES TO NEUROSTIMULATION

The present application claims priority from Australian Provisional Patent Application No 2022900218 filed on 4 Feb. 2022, the contents of which are incorporated herein by reference in their entirety.

TECHNICAL FIELD

The present invention relates to neural stimulation programming and in particular to selection of suitable neural response measurement parameters.

BACKGROUND OF THE INVENTION

There are a range of situations in which it is desirable to apply neural stimuli in order to alter neural function, a process known as neuromodulation. For example, neuromodulation is used to treat a variety of disorders including chronic neuropathic pain, Parkinson's disease, and migraine. A neuromodulation system applies an electrical pulse (stimulus) to neural tissue (fibres, or neurons) in order to generate a therapeutic effect. In general, the electrical stimulus generated by a neuromodulation system evokes a neural response known as an action potential in a neural fibre which then has either an inhibitory or excitatory effect. Inhibitory effects can be used to modulate an undesired process such as the transmission of pain, or excitatory effects may be used to cause a desired effect such as the contraction of a muscle.

When used to relieve neuropathic pain originating in the trunk and limbs, the electrical pulse is applied to the dorsal column (DC) of the spinal cord, a procedure referred to as spinal cord stimulation (SCS). Such a system typically comprises an implanted electrical pulse generator, and a power source such as a battery that may be transcutaneously rechargeable by wireless means, such as inductive transfer. An electrode array is connected to the pulse generator, and is implanted adjacent the target neural fibre(s) in the spinal cord, typically in the dorsal epidural space above the dorsal column. An electrical pulse of sufficient intensity applied to the target neural fibres by a stimulus electrode causes the depolarisation of neurons in the fibres, which in turn generates an action potential in the fibres. Action potentials propagate along the fibres in orthodromic (towards the head, or rostral) and antidromic (towards the cauda, or caudal) directions. The fibres being stimulated in this way inhibit the transmission of pain from a region of the body innervated by the target neural fibres (the dermatome) to the brain. To sustain the pain relief effects, stimuli are applied repeatedly, for example at a frequency in the range of 30 Hz-100 Hz.

For effective and comfortable neuromodulation, it is necessary to maintain stimulus intensity above a recruitment threshold. Stimuli below the recruitment threshold will fail to recruit sufficient neurons to generate action potentials with a therapeutic effect. In almost all neuromodulation applications, response from a single class of fibre is desired, but the stimulus waveforms employed can evoke action potentials in other classes of fibres which cause unwanted side effects. In pain relief, it is therefore necessary to apply stimuli with intensity below a discomfort threshold, above which uncomfortable or painful percepts arise due to over-recruitment of Aβ fibres. When recruitment is too large, Aβ fibres produce uncomfortable sensations. Stimulation at high intensity may even recruit Aδ fibres, which are sensory nerve fibres associated with acute pain, cold and pressure sensation. It is therefore desirable to maintain stimulus intensity within a therapeutic range between the recruitment threshold and the discomfort threshold.

The task of maintaining appropriate neural recruitment is made more difficult by electrode migration (change in position over time) and/or postural changes of the implant recipient (patient), either of which can significantly alter the neural recruitment arising from a given stimulus, and therefore the therapeutic range. There is room in the epidural space for the electrode array to move, and such array movement from migration or posture change alters the electrode-to-fibre distance and thus the recruitment efficacy of a given stimulus. Moreover, the spinal cord itself can move within the cerebrospinal fluid (CSF) with respect to the dura. During postural changes, the amount of CSF and/or the distance between the spinal cord and the electrode can change significantly. This effect is so large that postural changes alone can cause a previously comfortable and effective stimulus regime to become either ineffectual or painful.

Another control problem facing neuromodulation systems of all types is achieving neural recruitment at a sufficient level for therapeutic effect, but at minimal expenditure of energy. The power consumption of the stimulation paradigm has a direct effect on battery requirements which in turn affects the device's physical size and lifetime. For rechargeable systems, increased power consumption results in more frequent charging and, given that batteries only permit a limited number of charging cycles, ultimately this reduces the implanted lifetime of the device.

Attempts have been made to address such problems by way of feedback or closed-loop control, such as using the methods set forth in International Patent Publication No. WO2012/155188 by the present applicant. Feedback control seeks to compensate for relative nerve/electrode movement by controlling the intensity of the delivered stimuli so as to maintain a substantially constant neural recruitment. The intensity of a neural response evoked by a stimulus may be used as a feedback variable representative of the amount of neural recruitment. A signal representative of the neural response may be sensed by a measurement electrode in electrical communication with the recruited neural fibres, and processed to obtain the feedback variable. Based on the response intensity, the intensity of the applied stimulus may be adjusted to maintain the response intensity within a therapeutic range.

It is therefore desirable to accurately measure the intensity and other characteristics of a neural response evoked by the stimulus. The action potentials generated by the depolarisation of a large number of fibres by a stimulus sum to form a measurable signal known as an evoked compound action potential (ECAP). Accordingly, an ECAP is the sum of responses from a large number of single fibre action potentials. The ECAP generated from the depolarisation of a group of similar fibres may be measured at a measurement electrode as a positive peak potential, then a negative peak, followed by a second positive peak. This morphology is caused by the region of activation passing the measurement electrode as the action potentials propagate along the individual fibres.

Approaches proposed for obtaining a neural response measurement are described by the present applicant in International Patent Publication No. WO2012/155183, the content of which is incorporated herein by reference.

However, neural response measurement can be a difficult task as a neural response component in the sensed signal will typically have a maximum amplitude in the range of microvolts. In contrast, a stimulus applied to evoke the response is typically several volts, and manifests in the measured response as crosstalk of that magnitude. Moreover, stimulus generally results in electrode artefact, which manifests in the measured response as a decaying output of the order of several millivolts after the end of the stimulus. As the neural response can be contemporaneous with the stimulus crosstalk and/or the stimulus artefact, neural response measurements present a difficult challenge of measurement amplifier design. For example, to resolve a 10 µV ECAP with 1 µV resolution in the presence of stimulus crosstalk of 5 V requires an amplifier with a dynamic range of 134 dB, which is impractical in implantable devices. In practice, many non-ideal aspects of a circuit lead to artefact, and as these aspects mostly result in a time-decaying artefact waveform of positive or negative polarity, their identification and elimination can be laborious.

Evoked neural responses are less difficult to detect when they appear later in time than the artefact, or when the signal-to-noise ratio is sufficiently high. The artefact is often restricted to a time of 1-2 ms after the stimulus and so, provided the neural response is detected after this time window, a neural response measurement can be more easily obtained. This is the case in surgical monitoring where there are large distances (e.g. more than 12 cm for nerves conducting at 60 m·s$^{-1}$) between the stimulus and measurement electrodes so that the propagation time from the stimulus site to the measurement electrodes exceeds 2 ms, which is longer than the typical duration of stimulus artefact.

However, to characterize the responses from the dorsal column, high stimulation currents are required. Similarly, any implanted neuromodulation device will necessarily be of compact size, so that for such devices to monitor the effect of applied stimuli, the stimulus electrode(s) and measurement electrode(s) will necessarily be in close proximity. In such situations the measurement process must overcome artefact directly.

Closed-loop neural stimulation therapy is governed by a number of parameters to which values must be assigned to implement the therapy. The effectiveness of the therapy depends in large measure on the suitability of the assigned parameter values to the patient undergoing the therapy. As patients vary significantly in their physiological characteristics, a "one-size-fits-all" approach to parameter value assignment is likely to result in ineffective therapy for a large proportion of patients. An important preliminary task, once a neuromodulation device has been implanted in a patient, is therefore to assign values to the therapy parameters that maximise the effectiveness of the therapy the device will deliver to that particular patient. This task is known as programming or fitting the device. Programming generally involves applying certain test stimuli via the device, recording responses, and based on the recorded responses, inferring or calculating the most effective parameter values for the patient. The resulting parameter values are then formed into a "program" that may be loaded to the device to govern subsequent therapy. Some of the recorded responses may be neural responses evoked by the test stimuli, which provide an objective source of information that may be analysed along with subjective responses elicited from the patient. In an effective programming system, the more responses that are analysed, the more effective the eventual assigned parameter values should be.

However, programming may be costly and time-consuming if unnecessarily prolonged. There is therefore an incentive to minimise the number of test stimuli to be applied and the amount of information to be recorded and analysed in order to produce the assigned values of the therapy parameters. One task of particular importance in programming a closed-loop neural stimulation therapy is to set parameters for ECAP measurement. In principle any electrode not in use as a stimulus electrode may be used as a measurement electrode. Therefore, one task is to choose the most suitable measurement electrode for a given stimulus electrode. An ECAP changes morphologically as it propagates along the spinal cord and therefore the ideal parameters of any kind of morphologically-matched ECAP detector are different at different measurement electrodes because of their different locations relative to the stimulus site where the ECAP is first evoked. One such morphologically-matched ECAP detector, which is parametrised by two parameters, is disclosed in International Patent Publication No. WO2015/074121 by the present applicant, the contents of which are incorporated herein by reference. To select a combination of parameters for a parametric ECAP detector at a given measurement electrode, all possible combinations of parameters of the parametric ECAP detector may be tested via the responses to test stimuli and the combination that provides the best quality ECAP measurement may be selected. Further complicating the measurement parameter setting is the fact the ECAP measurement is usually carried out differentially between two measurement electrodes at different locations relative to the stimulus site. Optimising differential measurement adds the burden of searching over all possible combinations of parameters over all possible measurement electrode pairs to choose the most suitable detector parameters at the best measurement electrode pair. Such an exhaustive search typically involves delivering multiple stimuli of different intensities, e.g. as a ramp of intensity, even to detect an ECAP at each possible measurement electrode pair.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

SUMMARY OF THE INVENTION

Disclosed herein are technologies that provide a more efficient way of selecting the optimal parameter combination for a parametric ECAP detector at an arbitrary second measurement electrode pair. The disclosed aspects make use of one or more differential measurements of an ECAP at one or more known measurement electrode pairs The one or more measured differential ECAPs are used to estimate the arrival time and morphology of the differential ECAP at the second measurement electrode pair, using a single-ended ECAP model and an ECAP propagation model. From these, the optimal ECAP detector parameters (e.g. delay and period/frequency) for the second measurement electrode pair may be inferred. The disclosed technology significantly decreases the amount of time needed to evaluate the quality of ECAP measurements at multiple candidate measurement electrode pairs, since an exhaustive search no longer need be performed to identify the optimal parameters of the parametric ECAP detector at each candidate measurement electrode pair.

According to a first aspect of the present technology, there is provided a neurostimulation system comprising an implantable device for controllably delivering a neural stimulus, and a processor. The implantable device comprises: a plurality of electrodes including a stimulus electrode configuration and one or more pairs of sense electrodes; a stimulus source configured to provide a neural stimulus to be delivered via the stimulus electrode configuration to a neural pathway of a patient in order to evoke a compound action potential on the neural pathway; measurement circuitry configured to process signals sensed at each pair of sense electrodes subsequent to the delivered neural stimulus, each sensed signal including a differential evoked compound action potential (ECAP) evoked by the delivered neural stimulus; and a control unit configured to control the stimulus source to provide the neural stimulus. The processor is configured to: instruct the control unit to control the stimulus source to provide the neural stimulus; receive each sensed signal from the measurement circuitry; decompose the differential ECAP in each sensed signal into a first single-ended ECAP model corresponding to one sense electrode of the pair of sense electrodes and a second single-ended ECAP model corresponding to the other sense electrode of the pair of sense electrodes; and determine ECAP propagation model parameters from the first single-ended ECAP model and the second single-ended ECAP model and from distances of the respective sense electrodes from the stimulus electrode configuration. The processor is further configured to: determine originating ECAP model parameters from the first single-ended ECAP model and the second single-ended ECAP model and from distances of the corresponding sense electrodes from the stimulus electrode configuration; determine originating ECAP model parameters from the first single-ended ECAP model and from the distance of the corresponding sense electrode from the stimulus electrode configuration; and compute an optimal combination of parameters for a parametric ECAP detector at a second pair of sense electrodes from the propagating model parameters and the originating ECAP model parameters.

According to a second aspect of the present technology, there is provided an automated method of measuring an evoked neural compound action potential. The method comprises: delivering a neural stimulus via a stimulus electrode configuration to a neural pathway of a patient in order to evoke a compound action potential on the neural pathway; sensing a signal at each pair of sense electrodes of one or more pairs of sense electrodes subsequent to the delivered neural stimulus, each sensed signal including a differential evoked compound action potential (ECAP) evoked by the delivered neural stimulus; decomposing the differential ECAP in each sensed signal into a first single-ended ECAP model corresponding to one sense electrode of the pair of sense electrodes and a second single-ended ECAP model corresponding to the other sense electrode of the pair of sense electrodes; determining ECAP propagation model parameters from the first single-ended ECAP model and the second single-ended ECAP model and from distances of the respective sense electrodes from the stimulus electrode configuration; determining originating ECAP model parameters from the first single-ended ECAP model and from the distance of the corresponding sense electrode from the stimulus electrode configuration; and computing an optimal combination of parameters for a parametric ECAP detector at a second pair of sense electrodes from the propagating model parameters and the originating ECAP model parameters.

According to a third aspect of the present technology, there is provided a neurostimulation system comprising: an implantable device for controllably delivering a neural stimulus, and a processor. The implantable device comprises: a plurality of electrodes including a stimulus electrode configuration and one or more pairs of sense electrodes; a stimulus source configured to provide a neural stimulus to be delivered via the stimulus electrode configuration to a neural pathway of a patient in order to evoke a compound action potential on the neural pathway; measurement circuitry configured to process signals sensed at each pair of sense electrodes subsequent to the delivered neural stimulus, each sensed signal including a differential evoked compound action potential (ECAP) evoked by the delivered neural stimulus; and a control unit configured to control the stimulus source to provide the neural stimulus. The processor is configured to: instruct the control unit to control the stimulus source to provide the neural stimulus; receive each sensed signal from the measurement circuitry; decompose the differential ECAP in each sensed signal into a first single-ended ECAP model corresponding to one sense electrode of the pair of sense electrodes and a second single-ended ECAP model corresponding to the other sense electrode of the pair of sense electrodes; determine an ECAP propagation model parameter from the first single-ended ECAP model and the second single-ended ECAP model and distances of the corresponding sense electrodes from the stimulus electrode configuration; and communicate an indication to a user if the ECAP propagation model parameters departs from a predetermined range.

According to a fourth aspect of the present technology, there is provided an automated method of measuring an evoked neural compound action potential, the method comprising:
delivering a neural stimulus via a stimulus electrode configuration to a neural pathway of a patient in order to evoke a compound action potential on the neural pathway;
sensing a signal at each pair of sense electrodes of one or more pairs of sense electrodes, subsequent to the delivered neural stimulus each sensed signal including a differential evoked compound action potential (ECAP) evoked by the delivered neural stimulus;
decomposing the differential ECAP in each sensed signal into a first single-ended ECAP model corresponding to one sense electrode of the pair of sense electrodes and a second single-ended ECAP model corresponding to the other sense electrode of the pair of sense electrodes;
determining one or more ECAP propagation model parameters from the first single-ended ECAP model and the second single-ended ECAP model and distances of the corresponding sense electrodes from the stimulus electrode configuration; and
passing an indication to a user if one of the one or more propagation model parameters departs from a predetermined range.

In some embodiments of the invention, in order to compute the optimal combination of parameters the processor may be configured to: compute, based on the propagation model parameters and the originating ECAP model parameters, parameters of a model of a differential ECAP at a second pair of sense electrodes; and compute the optimal combination of parameters from the parameters of the model of the differential ECAP at the second pair of sense electrodes.

In some embodiments of the invention, decomposing the differential ECAP may comprise estimating single-ended ECAP model parameters for each of the single-ended ECAP models. For example, determining the ECAP propagation model parameters may comprise estimating the ECAP propagation model parameters from the single-ended ECAP model parameters for each of the single-ended ECAP models and from the distances.

In some embodiments of the invention, determining the originating ECAP model parameters may comprise estimating the originating ECAP model parameters from the ECAP propagation model parameters, the single-ended ECAP model parameters for the first single-ended ECAP model, and the distance of the corresponding sense electrode from the stimulus electrode configuration.

In some embodiments of the invention, computing the parameters of a model of a differential ECAP at the second pair of sense electrodes may comprise applying the propagation model to the originating ECAP model parameters and the distances of the second pair of sense electrodes from the stimulus electrode configuration.

In some embodiments of the invention, the processor may be further configured to: instruct the control unit to control the stimulus source to provide a neural stimulus; receive a signal sensed subsequent to the delivered neural stimulus via the second pair of sense electrodes from the measurement circuitry; and measure, using the parametric ECAP detector, an intensity of a neural response in the sensed signal using the optimal combination of parameters. The processor may be further configured to adjust a stimulus parameter of a subsequent provided neural stimulus based on the measured neural response intensity.

In some embodiments of the invention, the second pair of sense electrodes may be a candidate measurement electrode pair, and the processor is further configured to: instruct the control unit to control the stimulus source to provide a plurality of neural stimuli at different stimulus intensities, receive signals sensed subsequent to the delivered neural stimuli via the candidate measurement electrode pair from the measurement circuitry; measure, using the parametric ECAP detector, an intensity of a neural response in each sensed signal using the optimal combination of parameters for the candidate measurement electrode pair, thereby yielding a plurality of (stimulus intensity, response intensity) pairs; and compute a quality indicator for the candidate measurement electrode pair from the plurality of (stimulus intensity, response intensity) pairs. The processor may be further configured to repeat the instructing, receiving, measuring, and computing a quality indicator for at least one other candidate measurement electrode pair. The processor may be still further configured to select one of the candidate measurement electrode pairs based on the respective quality indicators.

In some embodiments of the invention, the processor may be part of the implantable device.

Some embodiments of the invention may further comprise an external computing device in communication with the implantable device. The processor may be part of the external computing device.

In some embodiments of the invention, the parameters of the parametric ECAP detector may comprise: frequency and delay, or length and delay, or period and delay.

In some embodiments of the invention, the differential evoked compound action potential (ECAP) may comprise a representative differential ECAP $\overline{\Delta E}_{jk}(t)$ of a set $\{\Delta E_{jk}(t)\}$ of multiple differential ECAPs, all obtained at a sense electrode pair (j, k) in response to respective identical test stimuli. For example, the representative differential ECAP may be averaged from the set of multiple differential ECAPs.

In some embodiments of the invention, stimulus artefact may be removed from the differential evoked compound action potential (ECAP) prior to decomposition.

In some embodiments of the invention, the ECAP propagation model parameters and the originating ECAP model parameters may be determined once, and may then be used to determine an optimal combination of parameters for a parametric ECAP detector at more than one pair of candidate sense electrodes.

References herein to estimation, determination, comparison and the like are to be understood as referring to an automated process carried out on data by a processor operating to execute a predefined procedure suitable to effect the described estimation, determination and/or comparison step(s). The technology disclosed herein may be implemented in hardware (e.g., using digital signal processors, application specific integrated circuits (ASICs) or field programmable gate arrays (FPGAs)), or in software (e.g., using instructions tangibly stored on non-transitory computer-readable media for causing a data processing system to perform the steps described herein), or in a combination of hardware and software. The disclosed technology can also be embodied as computer-readable code on a computer-readable medium. The computer-readable medium can include any data storage device that can store data which can thereafter be read by a computer system. Examples of the computer-readable medium include read-only memory ("ROM"), random-access memory ("RAM"), magnetic tape, optical data storage devices, flash storage devices, or any other suitable storage devices. The computer-readable medium can also be distributed over network-coupled computer systems so that the computer-readable code is stored and/or executed in a distributed fashion.

BRIEF DESCRIPTION OF THE DRAWINGS

One or more implementations of the invention will now be described with reference to the accompanying drawings, in which.

DETAILED DESCRIPTION OF THE PRESENT TECHNOLOGY

Figure 1:
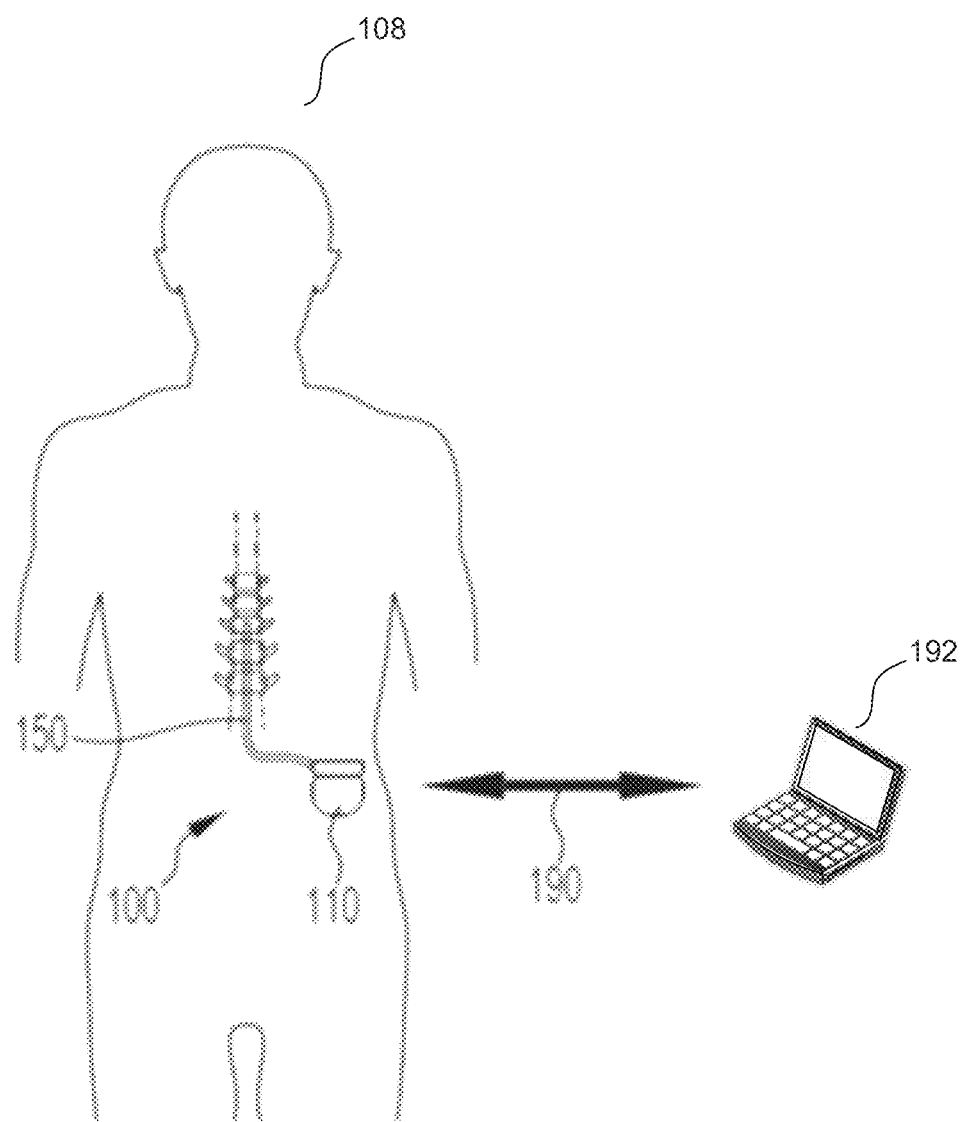
FIG. 1 schematically illustrates an implanted spinal cord stimulator, according to one implementation of the present technology.

FIG. 1 schematically illustrates an implanted spinal cord stimulator 100 in a patient 108, according to one implementation of the present technology. Stimulator 100 comprises an electronics module 110 implanted at a suitable location. In one implementation, stimulator 100 is implanted in the patient's lower abdominal area or posterior superior gluteal region. In other implementations, the electronics module 110 is implanted in other locations, such as a flank or subclavicularly. Stimulator 100 further comprises an electrode array 150 implanted within the epidural space and connected to the module 110 by a suitable lead. The electrode array 150 may comprise one or more electrodes such as electrode pads on a paddle lead, circular (e.g., ring) electrodes surrounding the body of the lead, conformable electrodes, cuff electrodes, segmented electrodes, or any other type of electrodes capable of forming unipolar, bipolar or multipolar electrode configurations for stimulation and measurement. The electrodes may pierce or affix directly to the tissue itself.

Numerous aspects of the operation of implanted stimulator 100 may be programmable by an external computing device 192, which may be operable by a user such as a clinician or the patient 108. Moreover, implanted stimulator 100 serves a data gathering role, with gathered data being communicated to external device 192 via a transcutaneous communications channel 190. Communications channel 190 may be active on a substantially continuous basis, at periodic intervals, at non-periodic intervals, or upon request from the external device 192. External device 192 may thus provide a clinical interface configured to program the implanted stimulator 100 and recover data stored on the implanted stimulator 100. This configuration is achieved by program instructions collectively referred to as the Clinical Programming Application (CPA) and stored in an instruction memory of the clinical interface.

Figure 2:
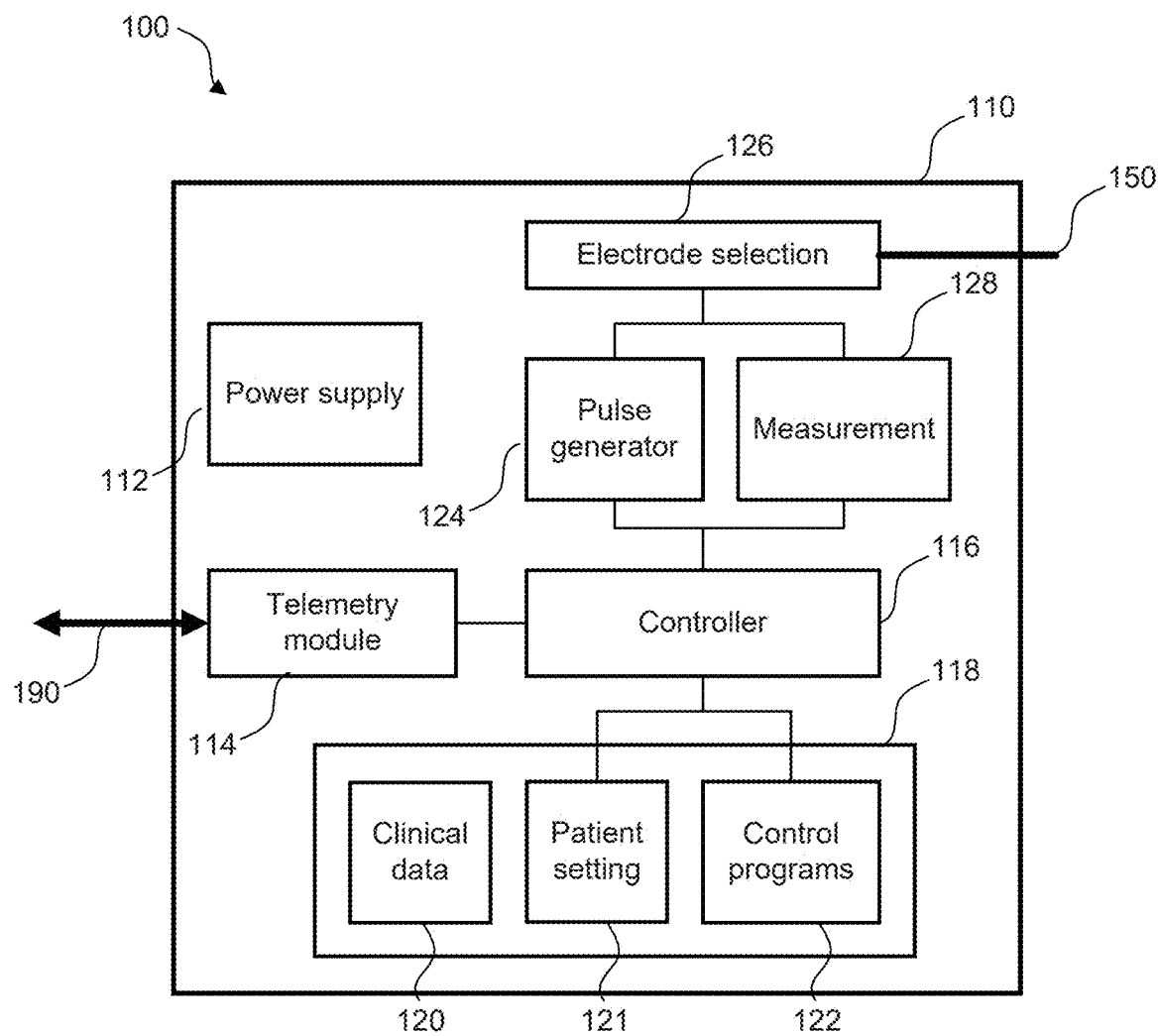
FIG. 2 is a block diagram of the stimulator of FIG. 1.

FIG. 2 is a block diagram of the stimulator 100. Electronics module 110 contains a battery 112 and a telemetry module 114. In implementations of the present technology, any suitable type of transcutaneous communications channel 190, such as infrared (IR), radiofrequency (RF), capacitive and/or inductive transfer, may be used by telemetry module 114 to transfer power and/or data to and from the electronics module 110 via communications channel 190. Module controller 116 has an associated memory 118 storing one or more of clinical data 120, patient settings 121, control programs 122, and the like. Controller 116 controls a pulse generator 124 to generate stimuli, such as in the form of pulses, in accordance with the patient settings 121 and control programs 122 Electrode selection module 126 switches the generated pulses to the selected electrode(s) of electrode array 150, for delivery of the pulses to the tissue surrounding the selected electrode(s). Measurement circuitry 128, which may comprise an amplifier and/or an analog-to-digital converter (ADC), is configured to process signals comprising neural responses sensed at measurement electrode(s) of the electrode array 150 as selected by electrode selection module 126.

Figure 3:
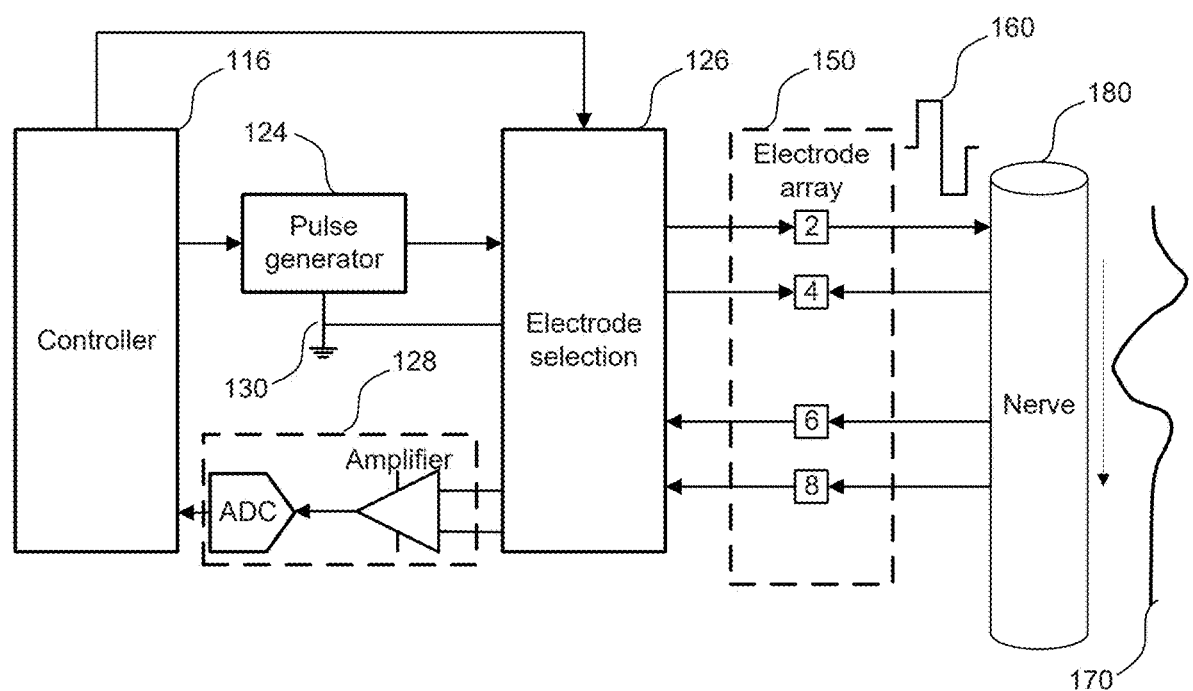
FIG. 3 is a schematic illustrating interaction of the implanted stimulator of FIG. 1 with a nerve.

FIG. 3 is a schematic illustrating interaction of the implanted stimulator 100 with a nerve 180 in the patient 108. In the implementation illustrated in FIG. 3 the nerve 180 may be located in the spinal cord, however in alternative implementations the stimulator 100 may be positioned adjacent any desired neural tissue including a peripheral nerve, visceral nerve, parasympathetic nerve or a brain structure. Electrode selection module 126 selects a stimulus electrode 2 of electrode array 150 through which to deliver a pulse from the pulse generator 124 to surrounding tissue including nerve 180. A pulse may comprise one or more phases, e.g. a biphasic stimulus pulse 160 comprises two phases. Electrode selection module 126 also selects a return electrode 4 of the electrode array 150 for stimulus current return in each phase, to maintain a zero net charge transfer. An electrode may act as both a stimulus and a return electrode over a complete multiphasic stimulus pulse. The use of two electrodes in this manner for delivering and returning current in each stimulus phase is referred to as bipolar stimulation. Alternative embodiments may apply other forms of bipolar stimulation, or may use a greater number of stimulus and/or return electrodes. In all cases, the set of stimulus electrodes and return electrodes is referred to as the stimulus electrode configuration (SEC). Electrode selection module 126 is illustrated as connecting to a ground 130 of the pulse generator 124 to enable stimulus current return via the return electrode 4. However, other connections for charge recovery may be used in other implementations.

Delivery of an appropriate stimulus from stimulus electrodes 2 and 4 to the nerve 180 evokes a neural response 170 comprising an evoked compound action potential (ECAP) which will propagate along the nerve 180 as illustrated at a rate known as the conduction velocity. The ECAP may be evoked for therapeutic purposes, which in the case of a spinal cord stimulator for chronic pain may be to create paraesthesia at a desired location. To this end, the stimulus electrodes 2 and 4 are used to deliver stimuli periodically at any therapeutically suitable frequency, for example 30 Hz, although other frequencies may be used including frequencies as high as the kHz range. In alternative implementations, stimuli may be delivered in a non-periodic manner such as in bursts, or sporadically, as appropriate for the patient 108. To program the stimulator 100 to the patient 108, a clinician may cause the stimulator 100 to deliver stimuli of various configurations which seek to produce a sensation that is experienced by the user as paraesthesia. When a stimulus electrode configuration is found which evokes paraesthesia in a location and of a size which is congruent with the area of the patient's body affected by pain, the clinician nominates that configuration for ongoing use. The therapy parameters may be loaded into the memory 118 of the stimulator 100 as the clinical settings 121.

Figure 6:
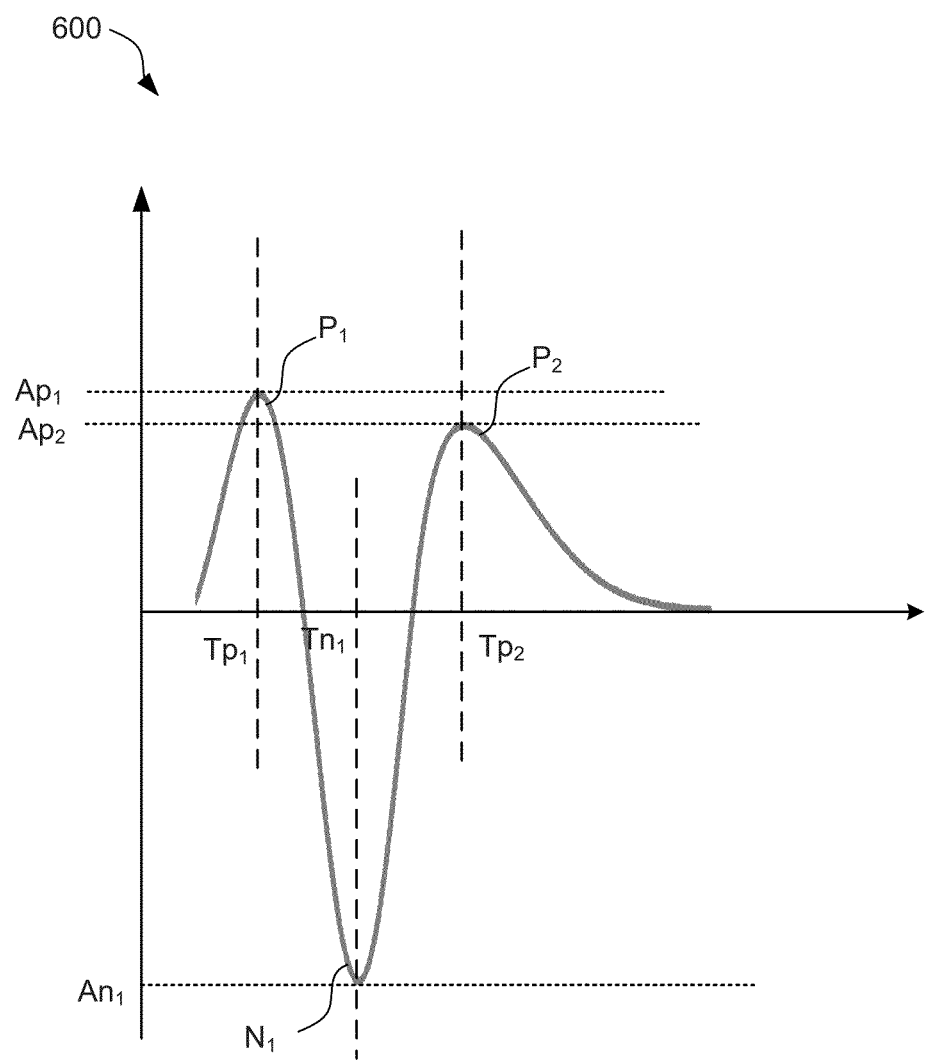
FIG. 6 illustrates the typical form of an electrically evoked compound action potential (ECAP) of a healthy subject.

FIG. 6 illustrates the typical form of an ECAP 600 of a healthy subject, as recorded at a single recording electrode referenced to the system ground 130. The shape and duration of the single-ended ECAP 600 shown in FIG. 6 is predictable because it is a result of the ion currents produced by the ensemble of fibres depolarising and generating action potentials (APs) in response to stimulation. The evoked action potentials (EAPs) generated synchronously among a large number of fibres sum to form the ECAP 600. The ECAP 600 generated from the synchronous depolarisation of a group of similar fibres comprises a positive peak P1, then a negative peak N1, followed by a second positive peak P2. This shape is caused by the region of activation passing the recording electrode as the action potentials propagate along the individual fibres.

The ECAP may be recorded differentially using two measurement electrodes, as illustrated in FIG. 3. Differential ECAP measurements are less subject to common-mode noise on the surrounding tissue than single-ended ECAP measurements. Depending on the polarity of recording, a differential ECAP may take an inverse form to that shown in FIG. 6. i.e. a form having two negative peaks N1 and N2, and one positive peak P1. Alternatively, depending on the distance between the two measurement electrodes, a differential ECAP may resemble the time derivative of the ECAP 600, or more generally the difference between the ECAP 600 and a time-delayed copy thereof.

The ECAP 600 may be characterised by any suitable characteristic(s) of which some are indicated in FIG. 6. The amplitude of the positive peak P1 is $Ap_1$ and occurs at time $Tp_1$. The amplitude of the positive peak P2 is $Ap_2$ and occurs at time $Tp_2$. The amplitude of the negative peak P1 is $An_1$ and occurs at time $Tn_1$. The peak-to-peak amplitude is $Ap_1+An_1$. A recorded ECAP will typically have a maximum peak-to-peak amplitude in the range of microvolts and a duration of 2 to 3 ms.

The stimulator 100 is further configured to detect the existence and measure the intensity of ECAPs 170 propagating along nerve 180, whether such ECAPs are evoked by the stimulus from electrodes 2 and 4, or otherwise evoked. To this end, any electrodes of the array 150 may be selected by the electrode selection module 126 to serve as recording electrode 6 and reference electrode 8, whereby the electrode selection module 126 selectively connects the chosen electrodes to the inputs of the measurement circuitry 128. Thus, signals sensed by the measurement electrodes 6 and 8 subsequent to the respective stimuli are passed to the measurement circuitry 128, which may comprise a differential amplifier and an analog-to-digital converter (ADC), as illustrated in FIG. 3. The recording electrode and the reference electrode are referred to as the measurement electrode pair. The measurement circuitry 128 for example may operate in accordance with the teachings of the above-mentioned International Patent Publication No. WO2012/155183 by the present applicant.

Signals sensed by the measurement electrodes 6, 8 and processed by measurement circuitry 128 are further processed by an ECAP detector implemented within controller 116, configured by control programs 122, to obtain information regarding the effect of the applied stimulus upon the nerve 180. In some implementations, the sensed signals are processed by the ECAP detector in a manner which measures and stores one or more characteristics from each evoked neural response or group of evoked neural responses contained in the sensed signal. In one such implementation, the characteristics comprise a peak-to-peak ECAP amplitude in microvolts (µV). For example, the sensed signals may be processed by the ECAP detector to determine the peak-to-peak ECAP amplitude in accordance with the teachings of International Patent Publication No. WO2015/074121, the contents of which are incorporated herein by reference Alternative implementations of the ECAP detector may measure and store an alternative characteristic from the neural response, or may measure and store two or more characteristics from the neural response.

Stimulator 100 applies stimuli over a potentially long period such as days, weeks, or months and during this time may store characteristics of neural responses, clinical settings, paraesthesia target level, and other operational parameters in memory 118. To effect suitable SCS therapy, stimulator 100 may deliver tens, hundreds or even thousands of stimuli per second, for many hours each day. Each neural response or group of responses generates one or more characteristics such as a measure of the intensity of the neural response. Stimulator 100 thus may produce such data at a rate of tens or hundreds of Hz, or even kHz, and over the course of hours or days this process results in large amounts of clinical data 120 which may be stored in the memory 118. Memory 118 is however necessarily of limited capacity and care is thus required to select compact data forms for storage into the memory 118, to ensure that the memory 118 is not exhausted before such time that the data is expected to be retrieved wirelessly by external device 192, which may occur only once or twice a day, or less.

Figure 4A:
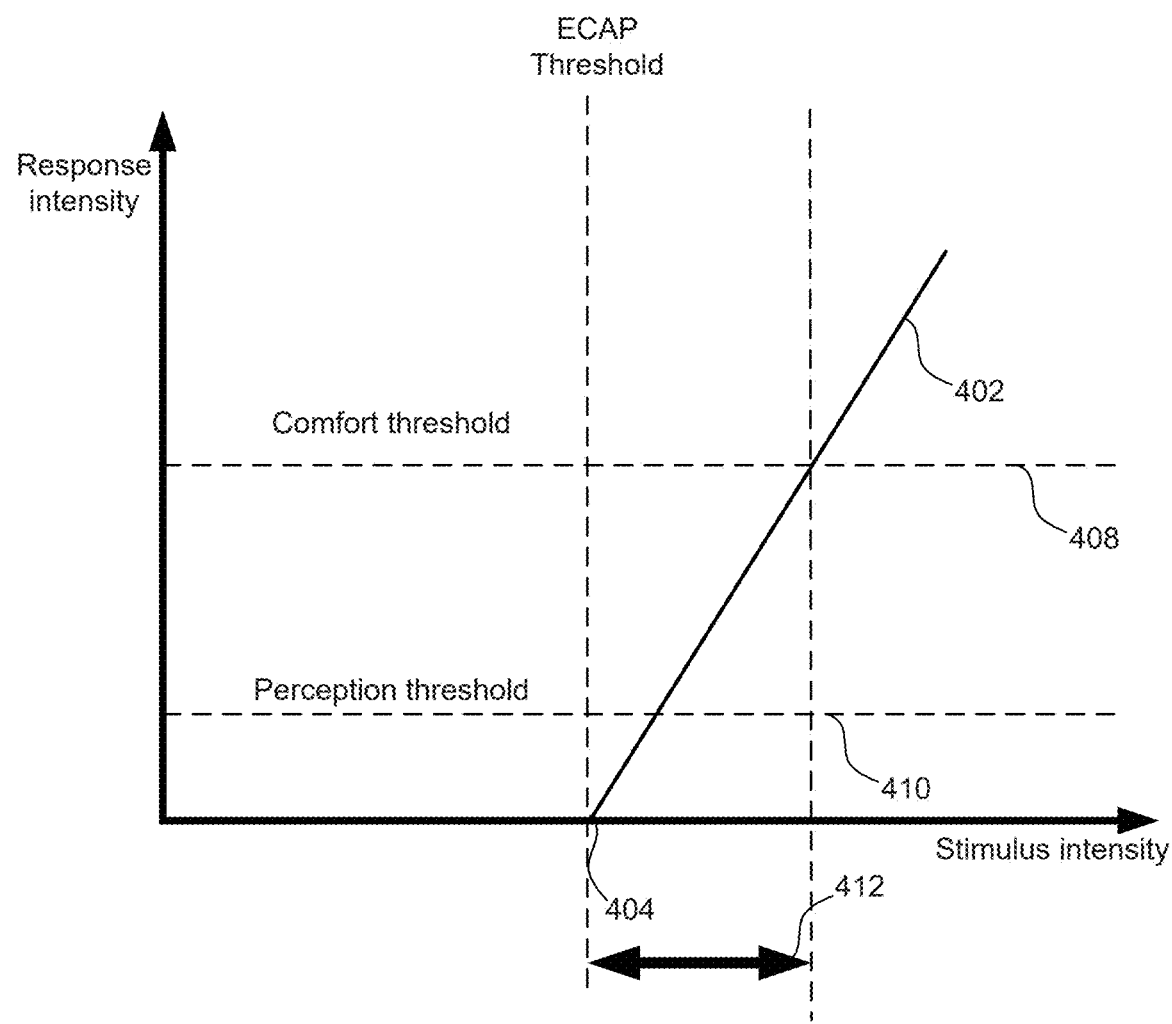
FIG. 4a illustrates an idealised activation plot for one posture of a patient undergoing neural stimulation.

An activation plot, or growth curve, is an approximation to the relationship between stimulus intensity (e.g. an amplitude of the current pulse 160) and intensity of neural response 170 resulting from the stimulus (e.g. an ECAP amplitude). FIG. 4a illustrates an idealised activation plot 402 for one posture of the patient 108. The activation plot 402 shows a linearly increasing ECAP amplitude for stimulus intensity values above a threshold 404 referred to as the ECAP threshold. The ECAP threshold exists because of the binary nature of fibre recruitment; if the field strength is too low, no fibres will be recruited. However, once the field strength exceeds a threshold, fibres begin to be recruited, and their individual evoked action potentials are independent of the strength of the field. The ECAP threshold 404 therefore reflects the field strength at which significant numbers of fibres begin to be recruited, and the increase in response intensity with stimulus intensity above the ECAP threshold reflects increasing numbers of fibres being recruited. Below the ECAP threshold 404, the ECAP amplitude may be taken to be zero. Above the ECAP threshold 404, the activation plot 402 has a positive, approximately constant slope indicating a linear relationship between stimulus intensity and the ECAP amplitude. Such a relationship may be modelled as:

$$y = \begin{cases} S(s - T), & s \geq T \\ 0, & s < T \end{cases} \quad (1)$$

where s is the stimulus intensity, y is the ECAP amplitude, T is the ECAP threshold and S is the slope of the activation plot (referred to herein as the patient sensitivity). The slope S and the ECAP threshold T are the key parameters of the activation plot 402.

FIG. 4a also illustrates a discomfort threshold 408, which is a stimulus intensity above which the patient 108 experiences uncomfortable or painful stimulation. FIG. 4a also illustrates a perception threshold 410. The perception threshold 410 corresponds to an ECAP amplitude that is perceivable by the patient. There are a number of factors which can influence the position of the perception threshold 410, including the posture of the patient. Perception threshold 410 may correspond to a stimulus intensity that is greater than the ECAP threshold 404, as illustrated in FIG. 4a, if patient 108 does not perceive low levels of neural activation. Conversely, the perception threshold 410 may correspond to a stimulus intensity that is less than the ECAP threshold 404, if the patient has a high perception sensitivity to lower levels of neural activation than can be detected in an ECAP, or if the signal to noise ratio of the ECAP is low.

For effective and comfortable operation of an implantable neuromodulation device such as the stimulator 100, it is desirable to maintain stimulus intensity within a therapeutic range. A stimulus intensity within a therapeutic range 412 is above the ECAP threshold 404 and below the discomfort threshold 408. In principle, it would be straightforward to measure these limits and ensure that stimulus intensity, which may be closely controlled, always falls within the therapeutic range 412. However, the activation plot, and therefore the therapeutic range 412, varies with the posture of the patient 108.

Figure 4B:
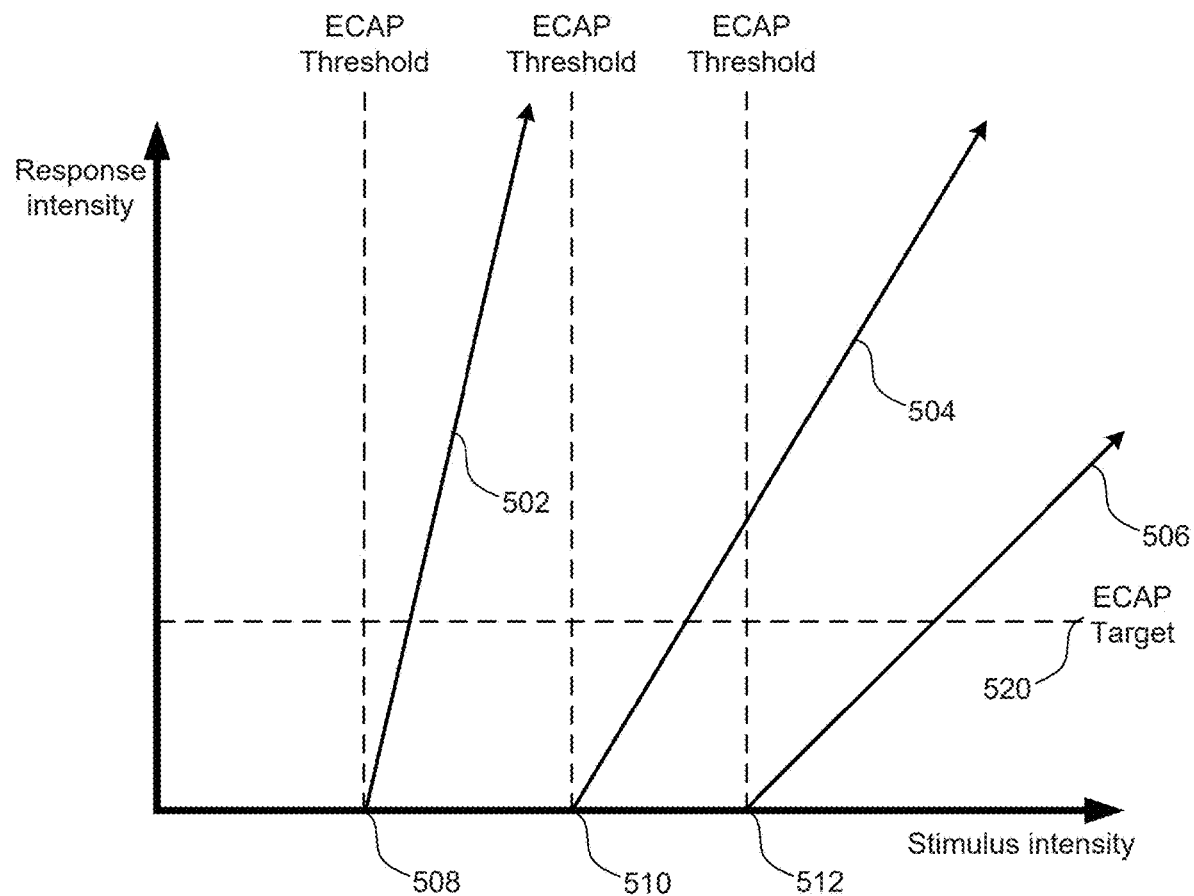
FIG. 4b illustrates the variation in the activation plots with changing posture of the patient.

FIG. 4b illustrates the variation in the activation plots with changing posture of the patient. A change in posture of the patient may cause a change in impedance of the electrode-tissue interface or a change in the distance between electrodes and the neurons. While the activation plots for only three postures, 502, 504 and 506, are shown in FIG. 4b, the activation plot for any given posture can lie between or outside the activation plots shown, on a continuously varying basis depending on posture. Consequently, as the patient's posture changes, the ECAP threshold changes, as indicated by the ECAP thresholds 508, 510, and 512 for the respective activation plots 502, 504, and 506. Additionally, as the patient's posture changes, the slope of the activation plot also changes, as indicated by the varying slopes of activation plots 502, 504, and 506. In general, as the distance between the stimulus electrodes and the spinal cord increases, the ECAP threshold increases and the slope of the activation plot decreases. The activation plots 502, 504, and 506 therefore correspond to increasing distance between stimulus electrodes and spinal cord, and decreasing patient sensitivity.

To keep the applied stimulus intensity within the therapeutic range as patient posture varies, in some implementations an implantable neuromodulation device such as the stimulator 100 may adjust the applied stimulus intensity based on a feedback variable that is determined from one or more measured ECAP characteristics. In one implementation, the device may adjust the stimulus intensity to maintain the measured ECAP amplitude at a target response intensity. For example, the device may calculate an error between a target ECAP amplitude and a measured ECAP amplitude, and adjust the applied stimulus intensity to reduce the error as much as possible, such as by adding the scaled error to the current stimulus intensity. A neuromodulation device that operates by adjusting the applied stimulus intensity based on a measured ECAP characteristic is said to be operating in closed-loop mode and will also be referred to as a closed-loop neural stimulation (CLNS) device. By adjusting the applied stimulus intensity to maintain the measured ECAP amplitude at an appropriate target response intensity, such as an ECAP target 520 illustrated in FIG. 4b, a CLNS device will generally keep the stimulus intensity within the therapeutic range as patient posture varies.

A CLNS device comprises a stimulator that takes a stimulus intensity value and converts it into a neural stimulus comprising a sequence of electrical pulses according to a predefined stimulation pattern. The stimulation pattern is parametrised by multiple stimulus parameters including stimulus amplitude, pulse width, number of phases, order of phases, number of stimulus electrode poles (two for bipolar, three for tripolar etc.), and stimulus rate or frequency. At least one of the stimulus parameters, for example the stimulus amplitude, is controlled by the feedback loop.

In an example CLNS system, a user (e.g. the patient or a clinician) sets a target response intensity, and the CLNS device performs proportional-integral-differential (PID) control. In some implementations, the differential contribution is disregarded and the CLNS device uses a first order integrating feedback loop. The stimulator produces stimulus in accordance with a stimulus intensity parameter, which evokes a neural response in the patient. The intensity of an evoked neural response (e.g. an ECAP) is detected, and its amplitude measured by the CLNS device and compared to the target response intensity.

The measured neural response intensity, and its deviation from the target response intensity, is used by the feedback loop to determine possible adjustments to the stimulus intensity parameter to maintain the neural response at the target intensity If the target intensity is properly chosen, the patient receives consistently comfortable and therapeutic stimulation through posture changes and other perturbations to the stimulus/response behaviour.

Figure 5:
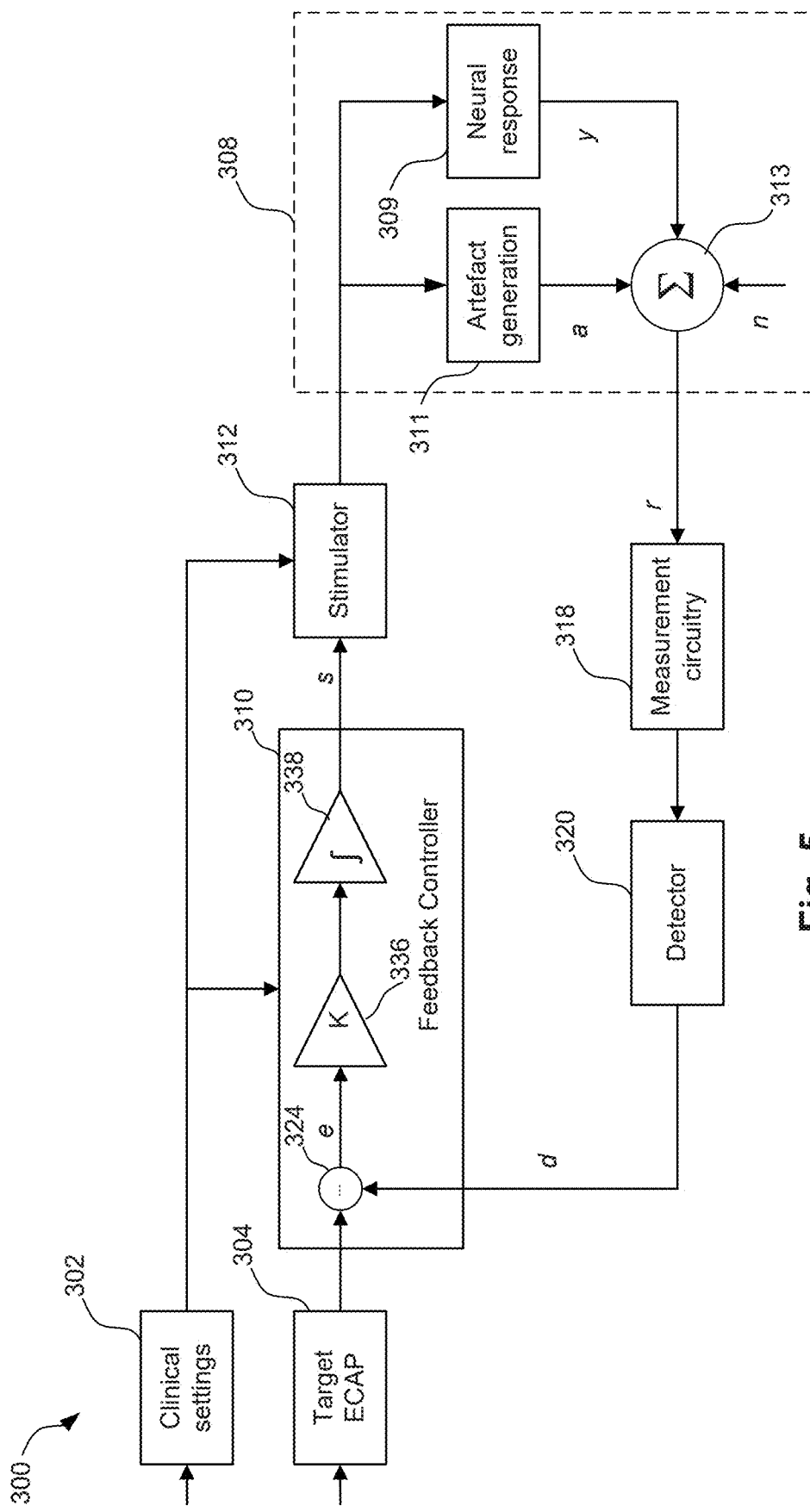
FIG. 5 is a schematic illustrating elements and inputs of a closed-loop neural stimulation system, according to one implementation of the present technology.

FIG. 5 is a schematic illustrating elements and inputs of a closed-loop neural stimulation (CLNS) system 300, according to one implementation of the present technology. The system 300 comprises a stimulator 312 which converts a stimulus intensity parameter (for example a stimulus current amplitude) s, in accordance with a set of predefined stimulus parameters, to a neural stimulus comprising a sequence of electrical pulses on the stimulus electrodes (not shown in FIG. 5). According to one implementation, the predefined stimulus parameters comprise the number and order of phases, the number of stimulus electrode poles, the pulse width, and the stimulus rate or frequency.

The generated stimulus crosses from the electrodes to the spinal cord, which is represented in FIG. 5 by the dashed box 308. The box 309 represents the evocation of a neural response y by the stimulus as described above. The box 311 represents the evocation of an artefact signal a, which is dependent on stimulus intensity and other stimulus parameters, as well as the electrical environment of the measurement electrodes. Various sources of noise n, as well as the artefact a, may add to the evoked response y at the summing element 313 to form the sensed signal r, including electrical noise from external sources such as 50 Hz mains power: electrical disturbances produced by the body such as neural responses evoked not by the device but by other causes such as peripheral sensory input, EEG, EMG, and electrical noise from measurement circuitry 318.

The neural recruitment arising from the stimulus is affected by mechanical changes, including posture changes, walking, breathing, heartbeat and so on. Mechanical changes may cause impedance changes, or changes in the location and orientation of the nerve fibres relative to the electrode array(s). As described above, the intensity of the evoked response provides a measure of the recruitment of the fibres being stimulated. In general, the more intense the stimulus, the more recruitment and the more intense the evoked response. An evoked response typically has a maximum amplitude in the range of microvolts, whereas the voltage resulting from the stimulus applied to evoke the response is typically several volts.

Measurement circuitry 318, which may be identified with measurement circuitry 128, amplifies the sensed signal r (including evoked neural response, artefact, and noise) and samples the amplified sensed signal r to capture a "signal window" comprising a predetermined number of samples of the amplified sensed signal r. The ECAP detector 320 processes the signal window and outputs a measured neural response intensity d. A typical number of samples in a captured signal window is 60. In one implementation, the neural response intensity comprises a peak-to-peak ECAP amplitude. The measured response intensity d is input into the feedback controller 310. The feedback controller 310 comprises a comparator 324 that compares the measured response intensity d to a target ECAP amplitude as set by the target ECAP controller 304 and provides an indication of the difference between the measured response intensity d and the target ECAP amplitude. This difference is the error value, e.

The feedback controller 310 calculates an adjusted stimulus intensity parameter, s, with the aim of maintaining a measured response intensity d equal to the target ECAP amplitude. Accordingly, the feedback controller 310 adjusts the stimulus intensity parameter s to minimise the error value, e. In one implementation, the controller 310 utilises a first order integrating function, using a gain element 336 and an integrator 338, in order to provide suitable adjustment to the stimulus intensity parameter s. According to such an implementation, the current stimulus intensity parameter s may be computed by the feedback controller 310 as $$s = \int K e \, dt \quad (2)$$

where K is the gain of the gain element 336 (the controller gain). This relation may also be represented as $$\delta s = K e \quad (3)$$

where δs is an adjustment to the current stimulus intensity parameter s.

A target ECAP amplitude is input to the comparator 324 via the target ECAP controller 304. In one embodiment, the target ECAP controller 304 provides an indication of a specific target ECAP amplitude. In another embodiment, the target ECAP controller 304 provides an indication to increase or to decrease the present target ECAP amplitude. The target ECAP controller 304 may comprise an input into the neuromodulation device, via which the patient or clinician can input a target ECAP amplitude, or indication thereof. The target ECAP controller 304 may comprise memory in which the target ECAP amplitude is stored, and from which the target ECAP amplitude is provided to the feedback controller 310.

A clinical settings controller 302 provides clinical settings to the system, including the gain K for the gain element 336 and the stimulus parameters for the stimulator 312. The clinical settings controller 302 may be configured to adjust the gain K of the gain element 336 to adapt the feedback loop to patient sensitivity. The clinical settings controller 302 may comprise an input into the neuromodulation device, via which the patient or clinician can adjust the clinical settings. The clinical settings controller 302 may comprise memory in which the clinical settings are stored, and are provided to components of the system 300.

In some implementations, two clocks (not shown) are used, being a stimulus clock operating at the stimulus frequency (e.g. 60 Hz) and a sample clock for sampling the sensed signal r (for example, operating at a sampling frequency of 10 kHz). As the ECAP detector 320 is linear, only the stimulus clock affects the dynamics of the CLNS system 300. On the next stimulus clock cycle, the stimulator 312 outputs a stimulus in accordance with the adjusted stimulus intensity s. Accordingly, there is a delay of one stimulus clock cycle before the stimulus intensity is updated in light of the error value e.

Figure 7:
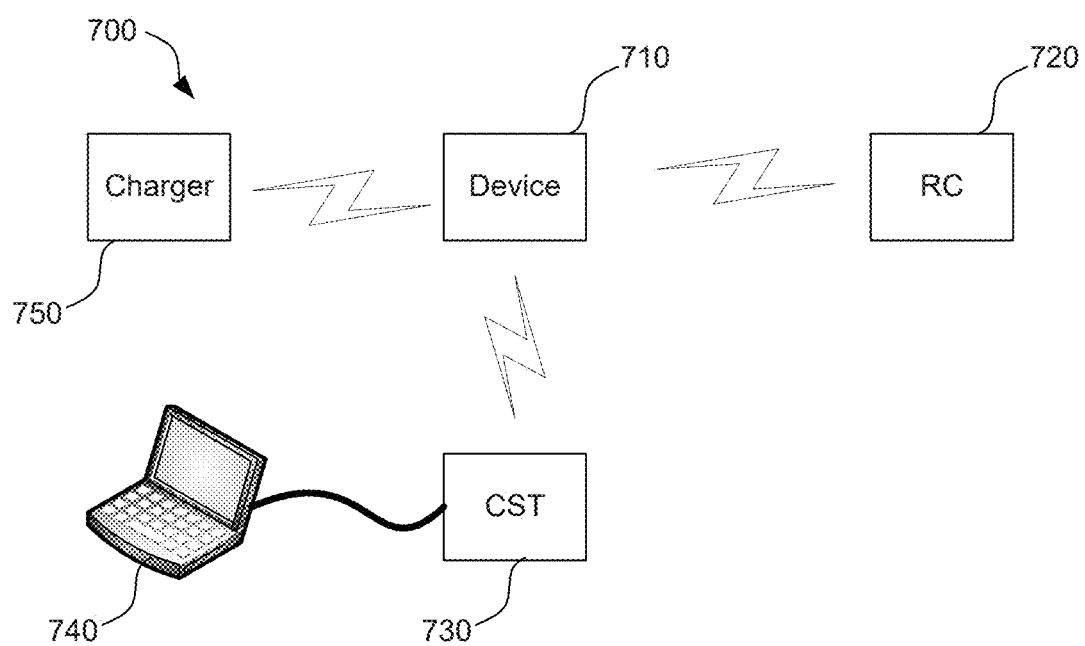
FIG. 7 is a block diagram of a neural stimulation therapy system including the implanted stimulator of FIG. 1 according to one implementation of the present technology.

FIG. 7 is a block diagram of a neural stimulation system 700. The neural stimulation system 700 is centred on a neuromodulation device 710. In one example, the neuromodulation device 710 may be implemented as the stimulator 100 of FIG. 1, implanted within a patient (not shown). The neuromodulation device 710 is connected wirelessly to a remote controller (RC) 720. The remote controller 720 is a portable computing device that provides the patient with control of their stimulation in the home environment by allowing control of the functionality of the neuromodulation device 710, including one or more of the following functions: enabling or disabling stimulation; adjustment of stimulus intensity or target neural response intensity; and selection of a stimulation control program from the control programs stored on the neuromodulation device 710.

The charger 750 is configured to recharge a rechargeable power source of the neuromodulation device 710. The recharging is illustrated as wireless in FIG. 7 but may be wired in alternative implementations.

The neuromodulation device 710 is wirelessly connected to a Clinical System Transceiver (CST) 730. The wireless connection may be implemented as the transcutaneous communications channel 190 of FIG. 1. The CST 730 acts as an intermediary between the neuromodulation device 710 and the Clinical Interface (CI) 740, to which the CST 730 is connected. A wired connection is shown in FIG. 7, but in other implementations, the connection between the CST 730 and the CI 740 is wireless.

The CI 740 may be implemented as the external computing device 192 of FIG. 1. The CI 740 is configured to program the neuromodulation device 710 and recover data stored on the neuromodulation device 710. This configuration is achieved by program instructions collectively referred to as the Clinical Programming Application (CPA) and stored in an instruction memory of the CI 740.

The CPA makes use of a user interface (UI) of the CI 740. The UI may comprise a device for displaying information to the user (e.g. a display) and a device for receiving input from the user, such as a touchscreen, movable pointing device controlling a cursor (mouse), keyboard, joystick, touchpad, trackball etc. In the example of a touchscreen, the input device may be combined with the display. Alternatively, the UI of the CI 740 the input device(s) may be separate from the display.

The Assisted Programming System

As mentioned above, obtaining patient feedback about their sensations is important during programming of closed-loop neural stimulation therapy, but mediation by trained clinical engineers is expensive and time-consuming. It would therefore be advantageous if patients could program their own implantable device themselves, or with some assistance from a clinician. However, interfaces for current programming systems are non-intuitive and generally unsuitable for direct use by patients because of their technical nature. There is therefore a need for a CPA to be as intuitive for non-technical users as possible while avoiding discomfort to the patient.

Implementations of an Assisted Programming System (APS) according to the present technology are generally configured to meet this need. In some implementations, the APS comprises two elements: the Assisted Programming Module (APM), which forms part of the CPA, and the Assisted Programming Firmware (APF), which forms part of the control programs 122 executed by the controller 116 of the electronics module 110. The data obtained from the patient is analysed by the APM to determine the parameters and settings for the neural stimulation therapy to be delivered by the stimulator 100. The APF is configured to complement the operation of the APM by responding to commands issued by the APM via the CST 730 to the stimulator 100 to deliver specified stimuli to the patient, and by returning, via the CST 730, measurements of neural responses to the delivered stimuli.

In other implementations, all the processing of the APS according to the present technology is done by the APF. In other words, the data obtained from the patient is not passed to the APM, but is analysed by the APF to determine the parameters and settings for the neural stimulation therapy to be delivered by the stimulator 100.

In implementations of the APS in which the APM analyses the data from the patient, the APS instructs the device 710 to capture and return signal windows to the CI 740 via the CST 730. In such implementations, the device 710 captures the signal windows using the measurement circuitry 128 and bypasses the ECAP detector 320, storing the data representing the raw signal windows temporarily in memory 118 before transmitting the data representing the captured signal windows to the APS for analysis.

Following the processing, the APS may load the determined program onto the device 710 to govern subsequent neural stimulation therapy. In one implementation, the program comprises clinical settings 121, also referred to as therapy parameters, that are input to the neuromodulation device by, or stored in the clinical settings controller 302. The patient may subsequently control the device 710 to deliver the therapy according to the determined program using the remote controller 720 as described above. The determined program may also, or alternatively, be loaded into the CPA for validation and modification.

Measurement Optimisation

As mentioned above, the neural responses may be processed by the ECAP detector 320 to measure the peak-to-peak ECAP amplitude in accordance with the teachings of International Patent Publication No. WO2015/074121. The implementation of the ECAP detector 320 disclosed in International Patent Publication No. WO2015/074121 is an example of a correlation-based detector. Such a correlation-based detector computes a cross-correlation between the samples in the captured signal window and the samples of a parametrised correlation filter template such as the 4-lobe filter and returns the amplitude of the ECAP in the signal window as the peak of the cross-correlation. One adjustable parameter of the 4-lobe filter is its length in samples, or equivalently its period in samples (half its length) or its frequency (the reciprocal of its period in samples, multiplied by the sampling frequency). For efficiency of implementation, the cross-correlation may be computed at a single correlation delay to measure the ECAP amplitude The other parameter of the 4-lobe filter is therefore the delay at which the single correlation is computed. In what follows, frequency and delay are used as the parameters of the 4-lobe filter, but it will be understood that length and delay, or period and delay, may equivalently be used.

Figure 8:
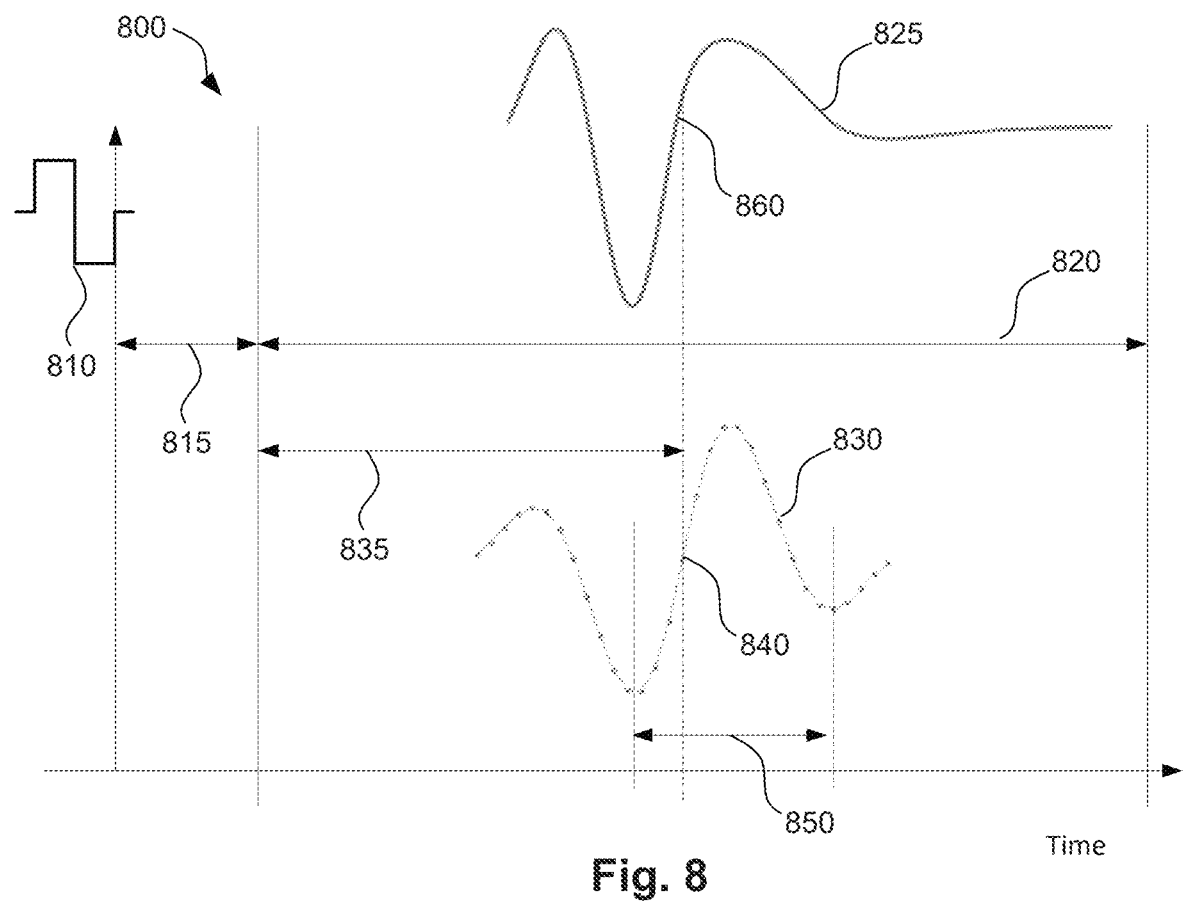
FIG. 8 is a time graph showing a differential ECAP and a 4-lobe filter with parameters suitably matched to measure the differential ECAP.

FIG. 8 is a time graph 800 showing a differential ECAP 825 and a 4-lobe filter 830 with parameters suitably matched to measure the differential ECAP. The biphasic stimulus pulse 810 evokes a single-ended ECAP which arrives at different times at each electrode of the measurement electrode pair. The differential ECAP 825 is the difference between the single-ended ECAPs of the measurement electrode pair, plotted with its time origin at the start of the signal window 820. The blanking period 815 starts at the end of the stimulus pulse 810. The signal window 820 starts at the end of the blanking period 815. The filter 830 is illustrated with its parameters (delay 835 and frequency) selected in order to most accurately estimate the amplitude of the differential ECAP 825. The delay 835 is the location of the reference point of the filter 830, illustrated in FIG. 8 as the point of symmetry 840 of the filter 830, relative to the start of the signal window 820. The frequency is the reciprocal of the period 850 between two peaks of the same polarity of the filter 830.

As mentioned above, one task of particular importance in programming a closed-loop neural stimulation therapy is to set optimal parameters for ECAP measurement. In principle any electrodes not in use as stimulus electrodes may be used as a measurement electrode pair. Therefore, one part of the task is to choose the most suitable ("optimal") measurement electrode pair for a given stimulus electrode configuration. An ECAP changes morphologically as it propagates along the spinal cord. Therefore, the ideal parameters of any kind of morphologically-matched parametric ECAP detector such as disclosed in International Patent Publication No. WO2015/074121 are different at different measurement electrode pairs because of their different locations relative both to the stimulus site where the ECAP is first evoked and to each other. The second part of the measurement optimisation task is therefore to select a combination of parameters for a parametric ECAP detector at a measurement electrode pair. The two tasks may be performed jointly as their results are dependent on each other.

In principle, all possible combinations of parameters of the parametric ECAP detector over all possible measurement electrode pairs may be tested via the responses to test stimuli and the pair and parameter combination that provides the best quality ECAP measurement may be selected. However, this brute force or exhaustive search approach would be undesirably time-consuming for any significant number of candidate measurement electrode pairs.

Technologies according to the present disclosure provide a more efficient way of selecting the optimal parameter combination for a parametric ECAP detector at an arbitrary measurement electrode pair. The disclosed aspects make use of one or more differential measurements of an ECAP at known measurement electrode pairs. The one or more measured differential ECAPs are used to estimate the arrival time and morphology of the differential ECAP at the arbitrary measurement electrode pair, using a single-ended ECAP model and an ECAP propagation model. From these, the optimal ECAP detector parameters (delay and period/frequency) for the arbitrary measurement electrode pair may be inferred. The present technology significantly decreases the amount of time needed to evaluate the quality of ECAP measurements at multiple candidate measurement electrode pairs, since an exhaustive search no longer needs to be performed to identify the optimal parameters of the parametric ECAP detector at each candidate measurement electrode pair.

International Patent Publication no. WO2020/124135 by the present applicant, the contents of which are herein incorporated by reference, discloses a single-ended ECAP model $e(f, t)$ as a product of two functions $\varphi(f, t)$ and $\phi(f, t)$, each parametrised by a frequency f.

$$e(f,t)=\varphi(f,t)\phi(f,t) \quad (4)$$

where $\varphi(f, t)$ is a Gamma probability density function:

$$\varphi(f,t)=(ft)^{0.7}\exp(-1.67ft) \quad (5)$$

and $\phi(f, t)$ is a piecewise function composed of one period (1/f) of a sine wave of frequency f followed by a decaying exponential function with time constant $1/2\pi f$ of such that the derivative is continuous at their boundary:

$$\phi(f, t) = \begin{cases} 0, & t < \dfrac{0.38}{2\pi f} \\ \sin 2\pi ft - 0.37, & \dfrac{0.38}{2\pi f} < t < \dfrac{1}{f} \\ 0.63 - \exp\left(-2\pi f\left(t - \dfrac{1}{f}\right)\right), & t > \dfrac{1}{f} \end{cases} \quad (6)$$

The parametrised single-ended ECAP model $E_0(t)$, a model of the single-ended ECAP that would be observed at the stimulus electrode (labelled as electrode 0), is a generalised version of the single-ended ECAP $e(f, t)$ that is scaled by a scaling factor $\kappa_0$, dilated in time by a dilation parameter $v_0$, and delayed in time by a delay $t_0$:

$$E_0(t) = \kappa_0 e\left(f, \frac{t - t_0}{v_0}\right) \quad (7)$$

The parametrised single-ended ECAP model $E_0(t)$ is referred to as the originating model, with scaling, dilation, and delay parameters $\kappa_0$, $v_0$, and $t_0$.

The frequency f may be arbitrarily set to a fixed value, e.g. 1 kHz, without loss of generality as variations in actual frequency from the set value among the measured ECAPs may be handled by the dilation parameter $v_0$.

A single-ended ECAP $E_j(t)$ arriving at measurement electrode j may be modelled as a scaled version of the originating model $E_0(t)$, where the scaling, dilation, and delay parameters $\kappa_j$, $v_j$, and $t_j$ are specific to electrode j:

$$E_j(t) = \kappa_j e\left(f, \frac{t - t_j}{v_j}\right) \quad (8)$$

A differential ECAP $\Delta E_{jk}(t)$ measured between recording electrode j and reference electrode k may therefore be modelled as:

$$\Delta E_{jk}(t) = \kappa_j e\left(f, \frac{t - t_j}{v_j}\right) - \kappa_k e\left(f, \frac{t - t_k}{v_k}\right) \quad (9)$$

Equation (9) may be fit to a measured differential ECAP $\Delta E_{jk}(t)$ at a measurement electrode pair (j, k) to estimate the parameters $\kappa_j$, $v_j$, and $t_j$, of the single-ended ECAP model at recording electrode j, and the parameters $\kappa_k$, $v_k$, and $t_k$ of the single-ended ECAP model at reference electrode k. The parameters $\kappa_j$, $v_j$, and $t_j$, are related to the parameters $\kappa_k$, $v_k$, and $t_k$ by a propagation model.

A propagation model describes the variation of scaling parameter, dilation parameter and delay parameter $\kappa_j$, $v_j$, and $t_j$ of the single-ended ECAP with distance along the electrode array. In one implementation, the propagation model models the variation in scaling factor $\kappa$ as an exponential decay with distance along the array:

$$\kappa_j = \kappa_0 \exp\left(-\frac{d(j)}{\tau}\right) \quad (10)$$

where $\tau$ is a constant of decay and $d(j)$ is the absolute distance (in arbitrary units, e.g. mm) between stimulus electrode 0) and recording electrode j.

In one implementation, the propagation model models the variation in time delay $t_j$ as a linear increase with distance of propagation along the array:

$$t_j = t_0 + \frac{d(j)}{v_c} \quad (11)$$

where $v_c$ is the conduction velocity of the ECAP along the array.

In one implementation, the propagation model models the variation in dilation v with a linear increase with distance along the array:

$$v_j = v_0 + sd(j) \quad (12)$$

where s is the dispersion of the ECAP along the array.

Once the single-ended ECAP model parameters $\kappa_j$, $v_j$, and $t_j$ at recording electrode j and the single-ended ECAP model parameters $\kappa_k$, $v_k$, and $t_k$ at reference electrode k have been estimated from the measured differential ECAP $\Delta E_{jk}(t)$, Equations (10) to (12) may be used to estimate the propagation model parameters $\tau$, $v_c$, and s from the parameters $\kappa_j$, $v_j$, $t_j$, $\kappa_k$, $v_k$, and $t_k$:

$$\tau = \frac{d(k) - d(j)}{\log\left(\dfrac{\kappa_j}{\kappa_k}\right)} \quad (13)$$

$$v_c = \frac{d(k) - d(j)}{t_k - t_j} \quad (14)$$

$$s = \frac{v_k - v_j}{d(k) - d(j)} \quad (15)$$

The originating model parameters $\kappa_0$, $v_0$, and $t_0$ may be obtained from the propagation model parameters $\tau$, $v_c$, and s and the single-ended ECAP model parameters $\kappa_j$, $v_j$, and $t_j$ at recording electrode j:

$$\kappa_0 = \kappa_j \exp\left(\frac{d(j)}{\tau}\right) \quad (16)$$

$$t_0 = t_j - \frac{d(j)}{v_c} \quad (17)$$

$$v_0 = v_j - sd(j) \quad (18)$$

Combining the originating model $E_0(t)$ at the stimulus site of Equation (7) with the propagation model of Equations (10) to (12) enables a single-ended ECAP at an arbitrary recording electrode n to be modelled as:

$$E_n(t) = \kappa_0 \exp\left(-\frac{d(n)}{\tau}\right) e\left(f, \frac{t - \left(t_0 + \dfrac{d(n)}{v_c}\right)}{v_0 + sd(n)}\right) \quad (19)$$

It follows that, having obtained the originating model parameters $\kappa_0$, $v_0$, and $t_0$ and the propagation model parameters $\tau$, $v_c$, and s from the original differential ECAP $\Delta E_{jk}(t)$, the differential ECAP $\Delta E_{nm}(t)$ at an arbitrary measurement electrode pair (n, m) may be estimated using Equation (19) and the distances d(n) and d(m). The distances d(n) and d(m) are easily computed from the measurement electrode indices n, and m and the pitch of the electrode array.

From the estimated differential ECAP $\Delta E_{nm}(t)$ at the arbitrary measurement electrode pair (n, m), the optimal ECAP detector parameters (frequency and delay) for that measurement electrode pair may be estimated.

Figure 9:
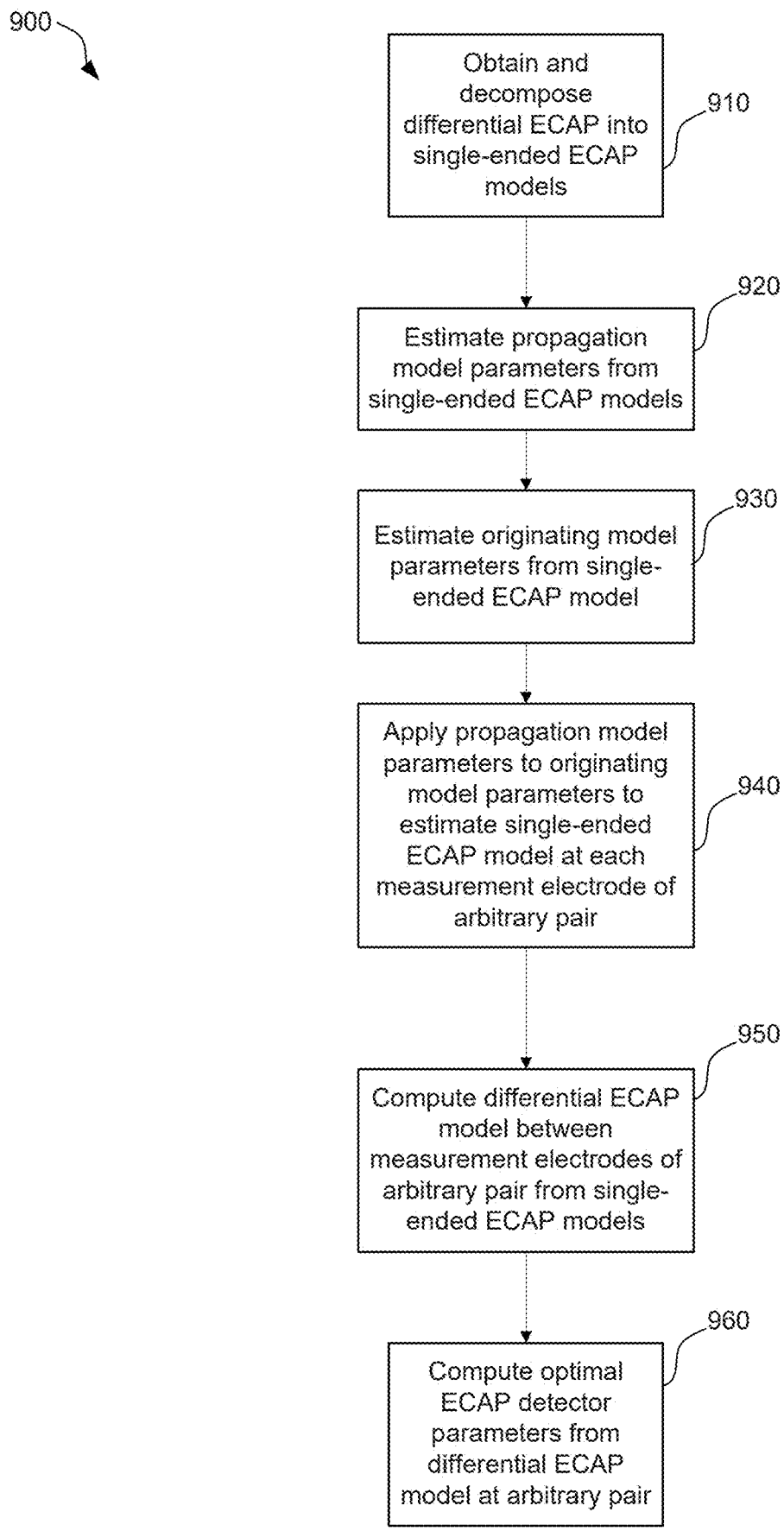
FIG. 9 is a flow chart illustrating a method of estimating optimal ECAP detector parameters for an arbitrary measurement electrode pair according to one aspect of the present technology.

FIG. 9 is a flow chart illustrating a method 900 of estimating the optimal ECAP detector parameters (frequency and delay) for an arbitrary measurement electrode pair according to one aspect of the present technology. The method 900 may be carried out by the APS as part of the task of setting optimal parameters for ECAP measurement.

The method 900 starts at step 910, which applies one or more test stimuli at a predetermined stimulus electrode configuration. Step 910 then obtains a differential ECAP $\Delta E_{jk}(t)$ evoked by the test stimuli at a measurement electrode pair (j, k), comprising recording electrode j and reference electrode k.

Step 910 then fits the differential ECAP model of Equation (9) to the differential ECAP $\Delta E_{jk}(t)$ to estimate the single-ended ECAP model parameters $\kappa_j$, $v_j$, and $t_j$ at the recording electrode j, along with the parameters $\kappa_k$, $v_k$, and $t_k$ of the single-ended ECAP model at the reference electrode k. Step 910 effectively decomposes the differential ECAP $\Delta E_{jk}(t)$ into two separately parametrised single-ended ECAP models $E_j(t)$ and $E_k(t)$.

In some implementations, step 910 may be carried out on a single differential ECAP $\Delta E_{jk}(t)$. In other implementations, step 910 may be carried out on a representative differential ECAP $\overline{\Delta E}_{jk}(t)$ of a set $\{\Delta E_{kt}(t)\}$ of multiple differential ECAPs, all obtained at the measurement electrode pair (j, k) in response to respective identical test stimuli. One example of a representative differential ECAP $\overline{\Delta E}_{jk}(t)$ is the average of the set of differential ECAPs $\{\Delta E_{jk}(t)\}$. Step 910 may also remove artefact from the signal window before obtaining each differential ECAP $\Delta E_{jk}(t)$.

Step 920 then estimates the parameters $\tau$, $v_c$, and s of the single-ended ECAP propagation model from the parameters of the two single-ended ECAP models from step 910, using Equations (13) to (15).

Step 930 then estimates the originating model parameters $\kappa_0$, $v_0$, and $t_0$ from the single-ended ECAP model parameters $\kappa_j$, $v_j$, and $t_j$ and the propagation model parameters $\tau$, $v_c$, and s using Equations (16) to (18).

In an alternative implementation, the above steps 910 and 930 may be implemented to estimate the originating model parameters $\kappa_0$, $v_0$, and $t_0$ and the propagation model parameters $\tau$, $v_c$, and s from multiple simultaneous differential ECAPs evoked by the same test stimulus at different measurement electrode pairs. Using multiple differential ECAPs adds robustness to the estimation of the six parameters at the cost of additional computation. In one implementation, step 910 is repeated for each differential ECAP to obtain a set of estimated parameters $\{\kappa_j, v_j, t_j\}$ for a range of distances d(j). It may be seen from Equations (10) to (12) that:

log ($\kappa_0$) is the intercept, and $-1/\tau$ the slope, of log ($\kappa_j$) plotted against d(j);

$t_0$ is the intercept, and $v_c$ the slope, of $t_j$ plotted against d(j);

$v_0$ is the intercept, and s the slope, of $v_j$ plotted against d(j);

Steps 920 and 930 may therefore fit respective straight lines to log ($\kappa_j$), $t_j$, and $v_j$ plotted against d(j), and estimate the propagation model parameters $\tau$, $v_c$, and s from the slopes, and $\kappa_0$, $v_0$, and $t_0$ from the intercepts, of the respective fitted lines.

In an alternative implementation that also uses multiple simultaneous differential ECAPs evoked by the same test stimulus at different measurement electrode pairs, a joint parameter optimisation estimates the propagation model parameters $\tau$, $v_c$, and s, and the originating model parameters $\kappa_0$, $v_0$, and $t_0$ from the set of simultaneous differential ECAP measurements by minimising a cost function derived from Equation (9) and the propagation model of Equations (10) to (12).

At the next step 940, the APS applies Equation (19) to estimate the single-ended ECAP models $E_n(t)$ and $E_m(t)$ at each electrode of an arbitrary measurement electrode pair (n, m). Step 950 then subtracts the single-ended ECAP model $E_m(t)$ at the reference electrode m from the single-ended ECAP model $E_n(t)$ at the recording electrode n to obtain the differential ECAP model $\Delta E_{nm}(t)$ at the arbitrary measurement electrode pair (n, m).

In some implementations of step 940, predetermined values for the propagation model parameters $\tau$, $v_c$, and s may be used instead of values estimated at step 920.

Finally, step 960 computes optimal ECAP detector parameters for a parametrised correlation-based ECAP detector at the arbitrary measurement electrode pair using the differential ECAP model $\Delta E_{nm}(t)$ at the arbitrary measurement electrode pair.

In the implementation of the method 900 in which the filter of the correlation-based detector is a 4-lobe filter, the parameters to be optimised are frequency and delay. In one such implementation, step 960 sets the frequency to the reciprocal of the time interval between the P1 and P2 peaks of the differential ECAP model $\Delta E_{nm}(t)$. The delay may be set to the zero-crossing point 860 between the N1 and P2 peaks of the differential ECAP model $\Delta E_{nm}(t)$, as illustrated in FIG. 8.

In another such implementation, steps 940 and 950 may be omitted. Instead, an alternative step applies Equation (11) to compute the delays $t_n$ and $t_m$ from d(n), d(m), $t_0$, and $v_c$, and applies Equation (12) to compute the dilations $v_n$ and $v_m$ from d(n), d(m), $v_0$, and s. Step 960 then sets the frequency of the correlation-based detector based on the frequencies $f/v_n$ and $f/v_m$, for example to their arithmetic mean, and the delay of the correlation-based detector based on the delays $t_n$ and $t_m$, for example to their arithmetic mean plus $1/f$.

In an alternative implementation of the method 900, the correlation-based detector uses a filter template that is derived from a representative signal that is known to contain a non-zero ECAP component. Such a correlation-based detector may be considered as a parametric detector, whereby the parameters of the filter template parameters are the actual samples of the filter template. In such an implementation of the method 900, step 960 may derive the samples of (i.e. the combination of parameters for) the filter template from the differential ECAP model $\Delta E_{nm}(t)$ as the representative signal. The derivation of the filter template from the representative signal is described in detail in Australian Provisional Patent Application no. 2022902847 by the present applicant, the full contents of which are hereby incorporated by reference.

The estimated propagation model parameters $\tau$, $v_c$, and s may be useful in their own right for other purposes. In particular regarding conduction velocity, the methods according to the present technology may be more accurate than a method based only on time-of-arrival of a certain ECAP feature, such as the P1 peak, at different recording electrodes. This is because the disclosed methods take the entire captured window data of each differential ECAP into account. Conduction velocity, if measured by the methods according to the present technology, is a useful biomarker of neurological health. Implementations of the method 900 that stop after step 930 and are executed wholly on the device 710 may be used to monitor conduction velocity during therapy. If the conduction velocity departs from a predetermined range, an indication may be communicated to a user, either via the CI 740 or the RC 720, that some manual reprogramming of the device 710 may be beneficial.

Steps 910 to 930 need be carried out only once, as pre-processing steps for a scan of multiple candidate measurement electrode pairs.

By contrast, steps 940 to 960 may be carried out once for each candidate measurement electrode pair, to find the optimal detector parameters for that candidate measurement electrode pair, before the candidate pair is assessed for suitability as a measurement electrode pair for a given stimulus electrode configuration.

Figure 10:
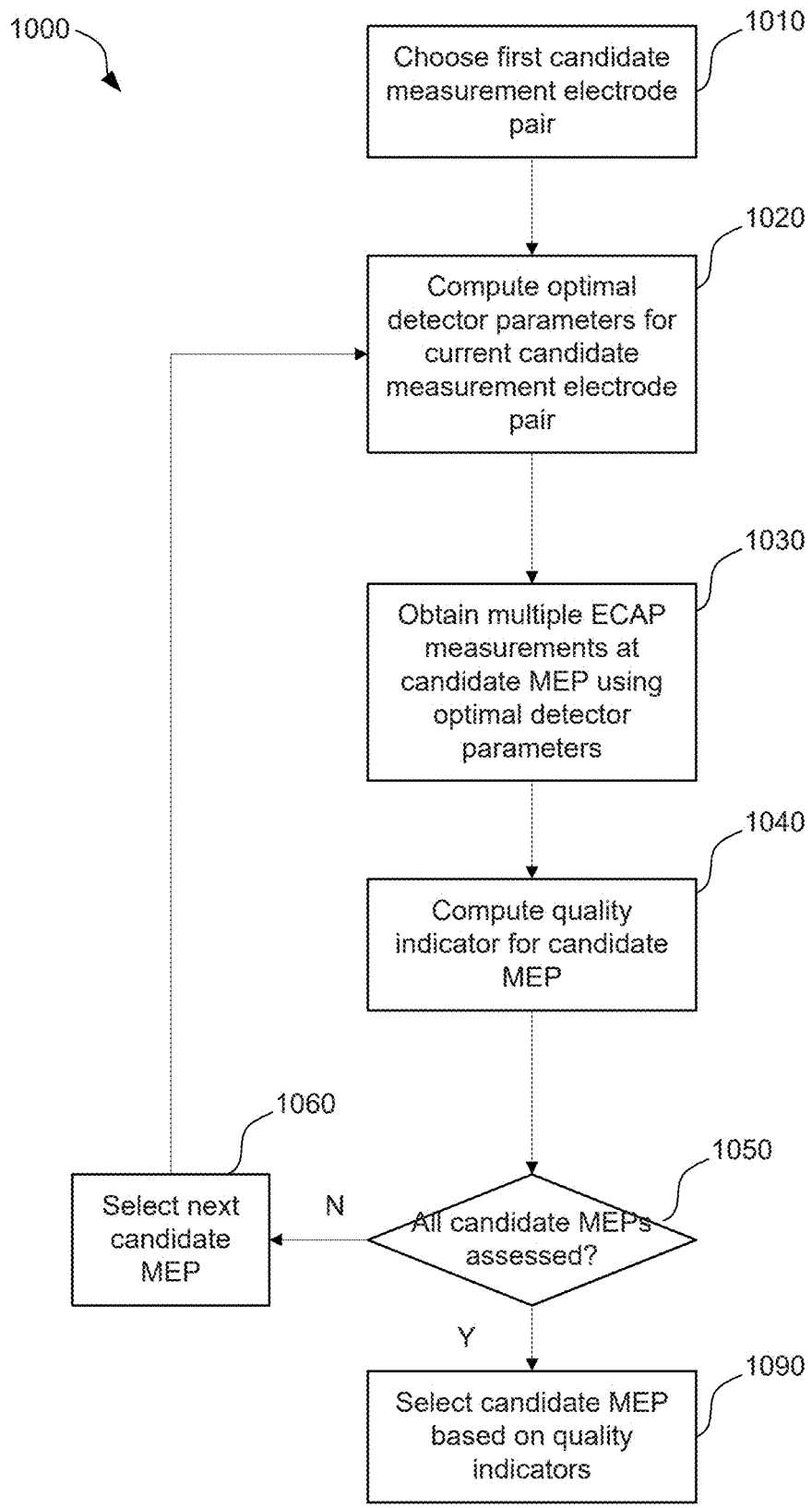
FIG. 10 is a flow chart illustrating a method of implementing a measurement electrode scan according to one aspect of the present technology.

International patent publication no. WO2021/007615, by the present applicant, the contents of which are herein incorporated by reference, describes a scan of measurement electrode pairs in which the steps 940 to 960 of the method 900 may be utilised. FIG. 10 is a flow chart, adapted from FIG. 11 of international patent publication no. WO2021/007615, illustrating a method 1000 of implementing a measurement electrode scan according to one aspect of the present technology. The method 1000 may be carried out by the APS as part of the task of setting optimal parameters for ECAP measurement from a predetermined stimulus electrode configuration.

In one implementation, the steps 910 to 930 are carried out as pre-processing for the method 1000, to obtain the originating model parameters $\kappa_0$, $v_0$, and $t_0$, and the propagation model parameters $\tau$, $v_c$, and s. In another implementation, predetermined values for the propagation model parameters $\tau$, $v_c$, and s are used instead of values estimated at step 920.

The method 1000 starts at step 1010 at which a first candidate measurement electrode pair (MEP) is selected from a set of multiple candidate MEPs. Step 1020 then uses steps 930 to 950 of the method 900 for the current candidate MEP, to find the optimal detector parameters for that candidate MEP. At step 1030, the APS delivers multiple stimuli at different stimulus intensities and obtains the respective (differential) ECAP intensity measurements at the current candidate MEP using the optimal detector parameters found at step 1020, thereby yielding a plurality of (stimulus intensity, response intensity) pairs. Step 1040 then uses the plurality of (stimulus intensity, response intensity) pairs to compute a quality indicator for the current candidate MEP as described in International patent publication no. WO2021/007615. Step 1050 checks whether all candidate MEPs have been assessed for measurement quality. If not ("N"), step 1060 selects the next candidate MEP for assessment and the method 1000 returns to step 1020. If so ("Y"), step 1090 selects a candidate MEP based on the quality indicators.

The selected MEP, along with its corresponding optimal detector parameters, may be used as the ECAP detector 320 in a CLNS system 300 as illustrated in FIG. 5. Alternatively, if the quality indicator of the selected MEP fails to meet a predetermined threshold, an indication may be communicated to a user, either via the CI 740 or the RC 720, that a suitable MEP cannot be found for the current stimulus electrode configuration.

In an alternative implementation of the method 1000, only one candidate MEP (the current MEP) is tested for its quality indicator. If the quality indicator fails to meet a threshold, step 1090 communicates an indication to a user, either via the CI 740 or the RC 720, that the current MEP is no longer satisfactory and some manual reprogramming of the measurement electrode pair would be beneficial.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not limiting or restrictive.

| LABEL LIST | |
|---|---|
| stimulator | 100 |
| patient | 108 |
| electronics module | 110 |
| battery | 112 |
| telemetry module | 114 |
| controller | 116 |
| memory | 118 |
| clinical data | 120 |
| patient settings | 121 |
| control programs | 122 |
| pulse generator | 124 |
| electrode selection module | 126 |
| measurement circuitry | 128 |
| ground | 130 |
| electrode array | 150 |
| current pulse | 160 |
| neural response | 170 |
| nerve | 180 |
| transcutaneous communications channel | 190 |
| external device | 192 |
| closed - loop neural stimulation system | 300 |
| clinical settings controller | 302 |
| target ECAP controller | 304 |
| box | 308 |
| box | 309 |
| feedback controller | 310 |
| box | 311 |
| stimulator | 312 |
| element | 313 |
| measurement circuitry | 318 |
| ECAP detector | 320 |
| comparator | 324 |
| gain element | 336 |
| integrator | 338 |
| activation plot | 402 |
| ECAP threshold | 404 |
| discomfort threshold | 408 |
| perception threshold | 410 |
| therapeutic range | 412 |
| respective activation plots | 502 |
| activation plot | 504 |
| activation plot | 506 |
| ECAP threshold | 508 |
| ECAP threshold | 510 |
| ECAP threshold | 512 |
| ECAP target | 520 |
| ECAP | 600 |
| Neural stimulation system | 700 |
| device | 710 |
| Remote controller | 720 |
| Clinical settings transceiver | 730 |
| clinical interface | 740 |
| charger | 750 |
| time graph | 800 |
| stimulus pulse | 810 |
| period | 815 |
| signal window | 820 |
| differential ECAP | 825 |
| filter | 830 |
| delay | 835 |
| point of symmetry | 840 |
| zero-crossing point | 860 |
| period | 850 |
| method | 900 |
| step | 910 |
| step | 920 |
| steps | 930 |

-continued

| LABEL LIST | |
|---|---|
| step | 940 |
| step | 950 |
| step | 960 |
| method | 1000 |
| step | 1010 |
| step | 1020 |
| step | 1030 |
| step | 1040 |
| step | 1050 |
| step | 1060 |
| step | 1090 |

The invention claimed is:

1. A neurostimulation system comprising:
an implantable device for controllably delivering a neural stimulus, the device comprising:
 a plurality of electrodes including a stimulus electrode configuration and one or more pairs of sense electrodes;
 a stimulus source configured to provide a neural stimulus to be delivered via the stimulus electrode configuration to a neural pathway of a patient in order to evoke a compound action potential on the neural pathway;
 measurement circuitry configured to process signals sensed at each pair of sense electrodes subsequent to the delivered neural stimulus, each sensed signal including a differential evoked compound action potential (ECAP) evoked by the delivered neural stimulus; and
 a control unit configured to control the stimulus source to provide the neural stimulus; and
a processor configured to:
 instruct the control unit to control the stimulus source to provide the neural stimulus;
 receive each sensed signal from the measurement circuitry;
 decompose the differential ECAP in each sensed signal into a first single-ended ECAP model corresponding to one sense electrode of the pair of sense electrodes and a second single-ended ECAP model corresponding to the other sense electrode of the pair of sense electrodes;
 determine ECAP propagation model parameters from the first single-ended ECAP model and the second single-ended ECAP model and from distances of the respective sense electrodes from the stimulus electrode configuration;
 determine originating ECAP model parameters from the first single-ended ECAP model and from the distance of the corresponding sense electrode from the stimulus electrode configuration; and
 compute an optimal combination of parameters for a parametric ECAP detector at a second pair of sense electrodes from the propagating model parameters and the originating ECAP model parameters.

2. The neurostimulation system of claim 1, wherein to compute the optimal combination of parameters the processor is configured to:
 compute, based on the propagation model parameters and the originating ECAP model parameters, parameters of a model of a differential ECAP at a second pair of sense electrodes; and
 compute the optimal combination of parameters from the parameters of the model of the differential ECAP at the second pair of sense electrodes.

3. The neurostimulation system of claim 1, wherein decomposing the differential ECAP comprises estimating single-ended ECAP model parameters for each of the single-ended ECAP models.

4. The neurostimulation system of claim 3, wherein determining the ECAP propagation model parameters comprises estimating the ECAP propagation model parameters from the single-ended ECAP model parameters for each of the single-ended ECAP models and from the distances.

5. The neurostimulation system of claim 1, wherein determining the originating ECAP model parameters comprises estimating the originating ECAP model parameters from the ECAP propagation model parameters, the single-ended ECAP model parameters for the first single-ended ECAP model, and the distance of the corresponding sense electrode from the stimulus electrode configuration.

6. The neurostimulation system of claim 1, wherein computing the parameters of a model of a differential ECAP at the second pair of sense electrodes comprises applying the propagation model to the originating ECAP model parameters and the distances of the second pair of sense electrodes from the stimulus electrode configuration.

7. The neurostimulation system of claim 1, wherein the processor is further configured to:
 instruct the control unit to control the stimulus source to provide a neural stimulus;
 receive a signal sensed subsequent to the delivered neural stimulus via the second pair of sense electrodes from the measurement circuitry; and
 measure, using the parametric ECAP detector, an intensity of a neural response in the sensed signal using the optimal combination of parameters.

8. The neurostimulation system of claim 7, wherein the processor is further configured to adjust a stimulus parameter of a subsequent provided neural stimulus based on the measured neural response intensity.

9. The neurostimulation system of claim 1, wherein the second pair of sense electrodes is a candidate measurement electrode pair, and the processor is further configured to:
 instruct the control unit to control the stimulus source to provide a plurality of neural stimuli at different stimulus intensities;
 receive signals sensed subsequent to the delivered neural stimuli via the candidate measurement electrode pair from the measurement circuitry;
 measure, using the parametric ECAP detector, an intensity of a neural response in each sensed signal using the optimal combination of parameters for the candidate measurement electrode pair, thereby yielding a plurality of (stimulus intensity, response intensity) pairs; and
 compute a quality indicator for the candidate measurement electrode pair from the plurality of (stimulus intensity, response intensity) pairs.

10. The neurostimulation system of claim 9, wherein the processor is further configured to repeat the instructing, receiving, measuring, and computing a quality indicator for at least one other candidate measurement electrode pair.

11. The neurostimulation system of claim 10, wherein the processor is further configured to select one of the candidate measurement electrode pairs based on the respective quality indicators.

12. The neurostimulation system of claim 1, wherein the processor is part of the implantable device.

13. The neurostimulation system of claim 1, further comprising an external computing device in communication with the implantable device.

14. The neurostimulation system of claim 13, wherein the processor is part of the external computing device.

15. The neurostimulation system of claim 1, wherein the parameters of the parametric ECAP detector comprise:
frequency and delay, or
length and delay, or
period and delay.

16. The neurostimulation system of claim 1, wherein the differential evoked compound action potential (ECAP) comprises a representative differential ECAP $AEy_k(t)$ of a set $\{AEjk(t)\}$ of multiple differential ECAPs, all obtained at a sense electrode pair (j, k) in response to respective identical test stimuli.

17. The neurostimulation system of claim 16, wherein the representative differential ECAP is averaged from the set of multiple differential ECAPs.

18. The neurostimulation system of claim 1, wherein artefact is removed from the differential evoked compound action potential (ECAP) prior to decomposition.

19. The neurostimulation system of claim 1, wherein the ECAP propagation model parameters and the originating ECAP model parameters are determined once, and then used to determine an optimal combination of parameters for a parametric ECAP detector at more than one pair of candidate sense electrodes.

20. An automated method of measuring an evoked neural compound action potential, the method comprising:
delivering a neural stimulus via a stimulus electrode configuration to a neural pathway of a patient in order to evoke a compound action potential on the neural pathway;
sensing a signal at each pair of sense electrodes of one or more pairs of sense electrodes subsequent to the delivered neural stimulus, each sensed signal including a differential evoked compound action potential (ECAP) evoked by the delivered neural stimulus;
decomposing the differential ECAP in each sensed signal into a first single-ended ECAP model corresponding to one sense electrode of the pair of sense electrodes and a second single-ended ECAP model corresponding to the other sense electrode of the pair of sense electrodes;
determining ECAP propagation model parameters from the first single-ended ECAP model and the second single-ended ECAP model and from distances of the respective sense electrodes from the stimulus electrode configuration;
determining originating ECAP model parameters from the first single-ended ECAP model and from the distance of the corresponding sense electrode from the stimulus electrode configuration; and
computing an optimal combination of parameters for a parametric ECAP detector at a second pair of sense electrodes from the propagating model parameters and the originating ECAP model parameters.

21. The method of claim 20, wherein computing the optimal combination of parameters comprises:
computing, based on the propagation model parameters and the originating ECAP model parameters, parameters of a model of a differential ECAP at a second pair of sense electrodes; and
computing the optimal combination of parameters from the parameters of the model of the differential ECAP at the second pair of sense electrodes.

22. The method of claim 20, wherein decomposing the differential ECAP comprises estimating single-ended ECAP model parameters for each of the single-ended ECAP models.

23. The method of claim 22, wherein determining the ECAP propagation model parameters comprises estimating the ECAP propagation model parameters from the single-ended ECAP model parameters for each of the single-ended ECAP models and from the distances.

24. The method of claim 20, wherein determining the originating ECAP model parameters comprises estimating the originating ECAP model parameters from the ECAP propagation model parameters, the single-ended ECAP model parameters for the first single-ended ECAP model, and the distance of the corresponding sense electrode from the stimulus electrode configuration.

25. The method of claim 20, wherein computing the parameters of a model of a differential ECAP at the second pair of sense electrodes comprises applying the propagation model to the originating ECAP model parameters and the distances of the second pair of sense electrodes from the stimulus electrode configuration.

26. The method of claim 20, further comprising:
delivering a neural stimulus via the stimulus electrode configuration;
sensing a signal subsequent to the delivered neural stimulus via the second pair of sense electrodes; and
measuring, using the parametric ECAP detector, an intensity of a neural response in the sensed signal using the optimal combination of parameters.

27. The method of claim 26, further comprising adjusting a stimulus parameter of a subsequent provided neural stimulus based on the measured neural response intensity.

28. The method of claim 20, wherein the second pair of sense electrodes is a candidate measurement electrode pair, and the method further comprises:
delivering a plurality of neural stimuli at different stimulus intensities;
sensing signals subsequent to the delivered neural stimuli via the candidate measurement electrode pair;
measuring, using the parametric ECAP detector, an intensity of a neural response in each sensed signal using the optimal combination of parameters for the candidate measurement electrode pair, thereby yielding a plurality of (stimulus intensity, response intensity) pairs; and
computing a quality indicator for the candidate measurement electrode pair from the plurality of (stimulus intensity, response intensity) pairs.

29. The method of claim 28, further comprising repeating the delivering, sensing, measuring, and computing a quality indicator for at least one other candidate measurement electrode pair.

30. The method of claim 29, further comprising selecting one of the candidate measurement electrode pairs based on the respective quality indicators.

* * * * *